United States Patent [19]
Wangler et al.

[11] Patent Number: 5,546,188
[45] Date of Patent: Aug. 13, 1996

[54] INTELLIGENT VEHICLE HIGHWAY SYSTEM SENSOR AND METHOD

[75] Inventors: Richard J. Wangler, Maitland; Robert L. Gustavson, Winter Springs; Robert E. McConnell, II, Longwood; Keith L. Fowler, Orlando, all of Fla.

[73] Assignee: Schwartz Electro-Optics, Inc., Orlando, Fla.

[21] Appl. No.: 179,568

[22] Filed: Jan. 10, 1994

Related U.S. Application Data

[63] Continuation-in-part of Ser. No. 980,273, Nov. 23, 1992, Pat. No. 5,321,490, and Ser. No. 997,737, Dec. 30, 1992, Pat. No. 5,278,423.

[51] Int. Cl.$^6$ ........................................... G01B 11/24
[52] U.S. Cl. ........................................... 356/376; 356/398
[58] Field of Search ................................. 356/376, 398

[56] References Cited

U.S. PATENT DOCUMENTS

| | | |
|---|---|---|
| 2,504,126 | 4/1950 | Howe . |
| 3,167,739 | 1/1965 | Girard et al. . |
| 3,436,540 | 4/1969 | Lamorlette . |
| 3,516,056 | 6/1970 | Matthews . |
| 3,532,886 | 10/1970 | Kruger, Jr., et al. . |
| 3,605,082 | 9/1971 | Matthews . |
| 3,633,010 | 1/1972 | Svetlichny . |
| 3,644,917 | 2/1972 | Perlman . |
| 3,680,047 | 7/1972 | Perlman . |
| 3,719,938 | 3/1973 | Perlman . |
| 3,852,592 | 12/1974 | Scoville et al. . |
| 3,972,021 | 7/1976 | Leitz et al. . |
| 4,023,020 | 5/1977 | Lestradet . |
| 4,179,216 | 12/1979 | Theurer et al. . |
| 4,317,117 | 2/1982 | Chasek . |
| 4,335,962 | 6/1982 | Di Matteo et al. ............... 356/376 |
| 4,433,328 | 2/1984 | Saphir et al. . |
| 4,484,069 | 11/1984 | Brenholdt . |
| 4,490,038 | 12/1984 | Theurer et al. . |
| 4,717,251 | 1/1988 | Wells et al. . |
| 4,768,713 | 9/1988 | Roper . |
| 4,790,660 | 12/1988 | Ito et al. ............................ 366/376 |
| 4,803,626 | 2/1989 | Bachman et al. . |
| 4,805,088 | 2/1989 | Cross et al. . |
| 4,823,268 | 4/1989 | Giles et al. . |
| 4,846,577 | 7/1989 | Grindon ........................... 356/376 |
| 5,111,056 | 5/1992 | Yoshimura et al. . |
| 5,118,180 | 6/1992 | Wichmann et al. . |
| 5,160,971 | 11/1992 | Koshizawa . |
| 5,172,861 | 12/1992 | Lenhardt . |
| 5,192,979 | 9/1993 | Grage et al. . |

*Primary Examiner*—Mark Hellner
*Attorney, Agent, or Firm*—Allen, Dyer, Doppelt, Franjola & Milbrath, P.A.

[57] ABSTRACT

An object sensor and method using pulsed laser range imaging technology is adapted for determining the velocity and three dimensional profile of a vehicle passing the sensor for classifying the type of vehicle for use in Intelligent Vehicle Highway Systems. A pair of scanned laser beams are provided by splitting a continuously pulsed laser beam from a transmitter and an optical receiver determines the presence of a vehicle in a predetermined zone such as a highway weigh station or toll booth. Range, angle and time data are collected and stored for use in determining the speed of the vehicle passing the sensor and its three dimensional profile. Forward and backward scanned beams are provided using alternate embodiments of a rotating mirror and using two transmitters/receivers in another embodiment. The pulsed energy is sent into the two divergent beams, which are received as reflective energy in a receiver. The receiver accepts reflections from the beams and provides inputs for purposes of determining time of flight, and for measuring the time interval between interceptions of the two divergent beams for a given vehicle. An encoder tracks the position of the mirror for providing angle data with associated range measurements. The vehicle speed is calculated for range data collected when the vehicle passes through the forward and backward scanned beams. Three dimensional profiles are compared with preselected vehicle profiles for classifying the vehicle.

33 Claims, 17 Drawing Sheets

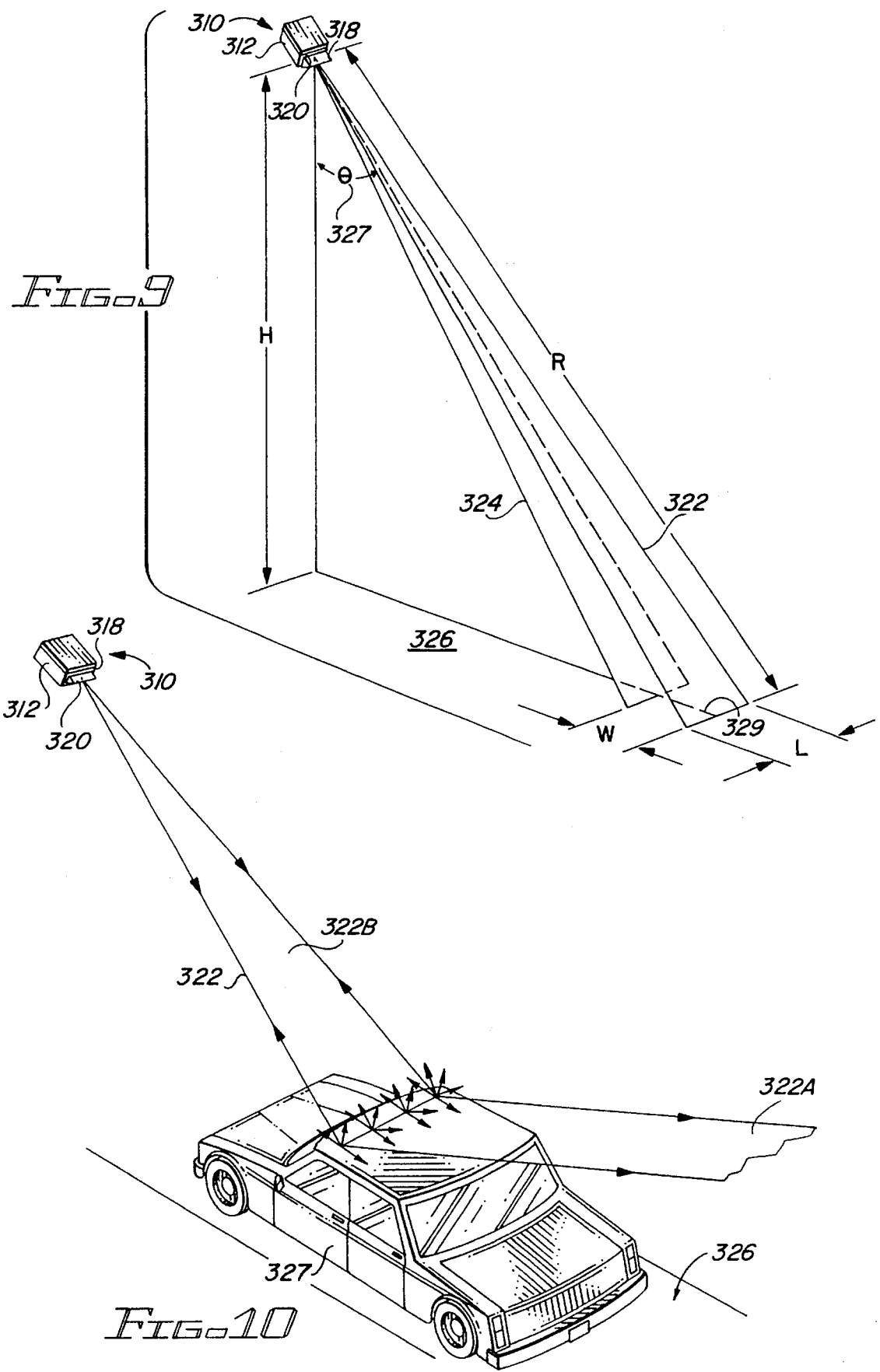

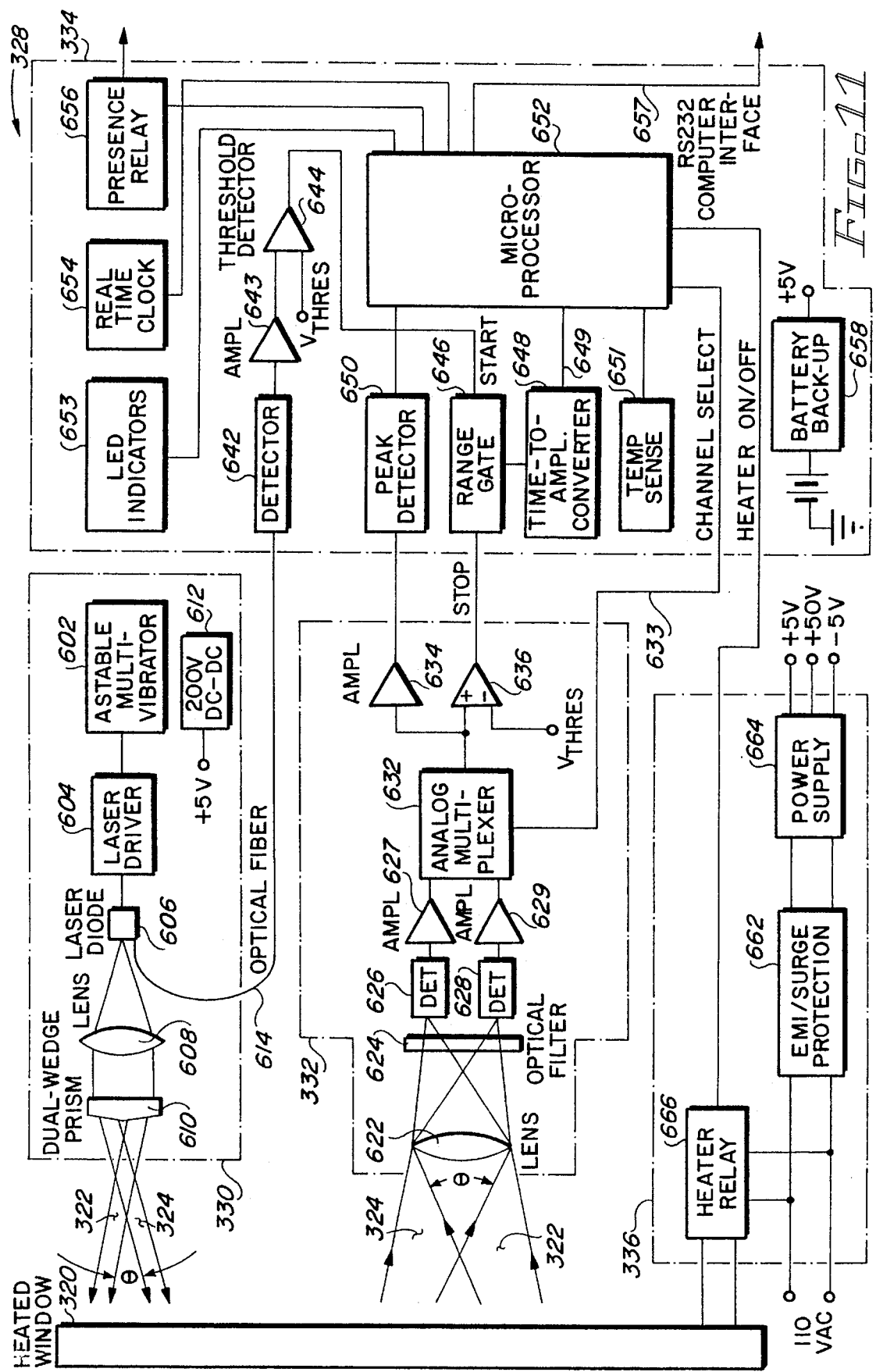

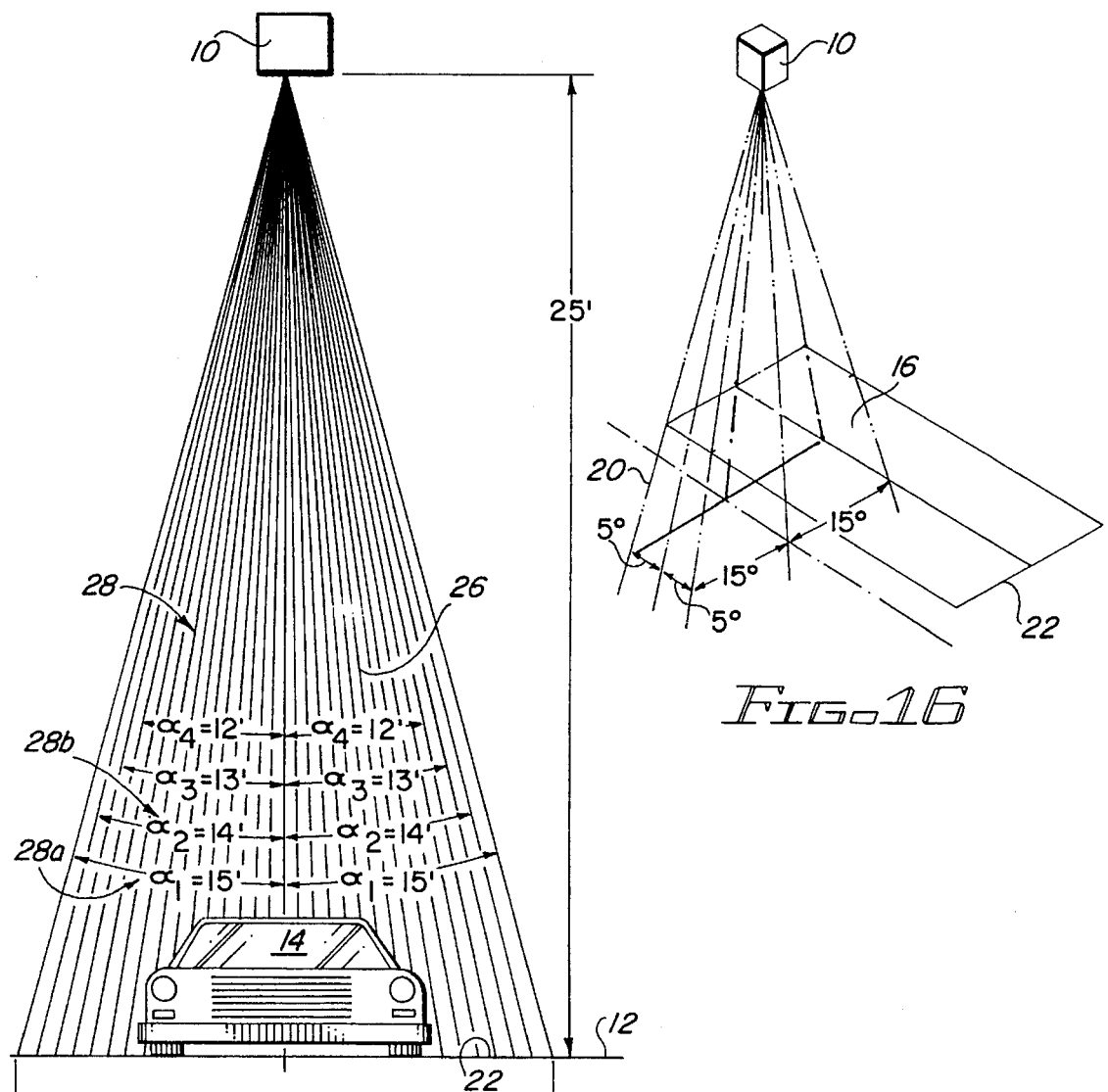
FIG.12
FIG.16
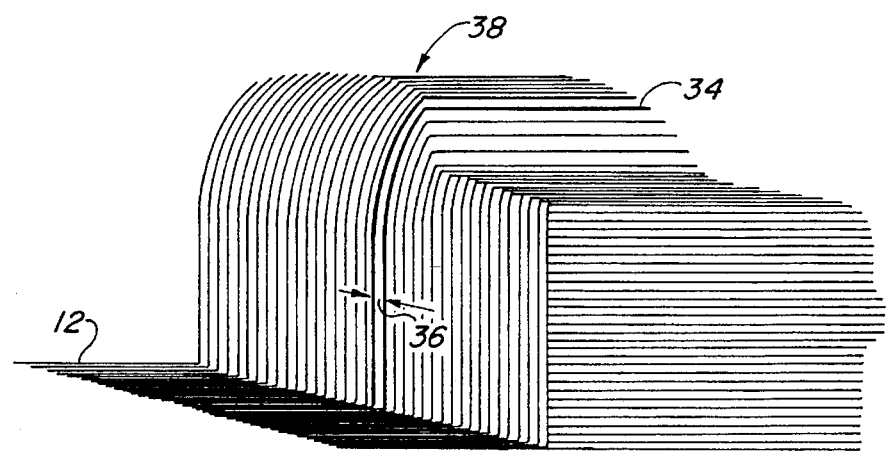
FIG.13

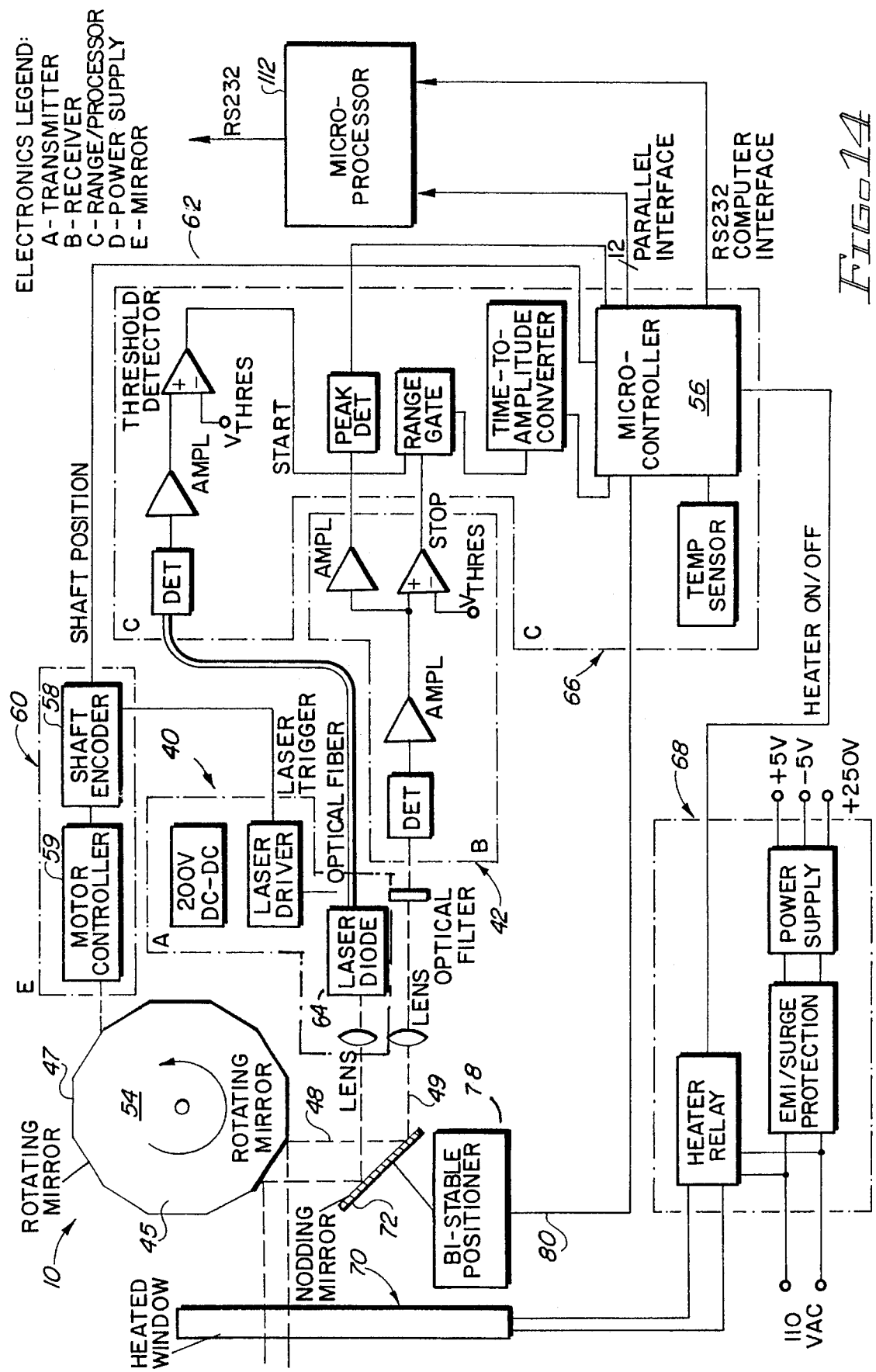

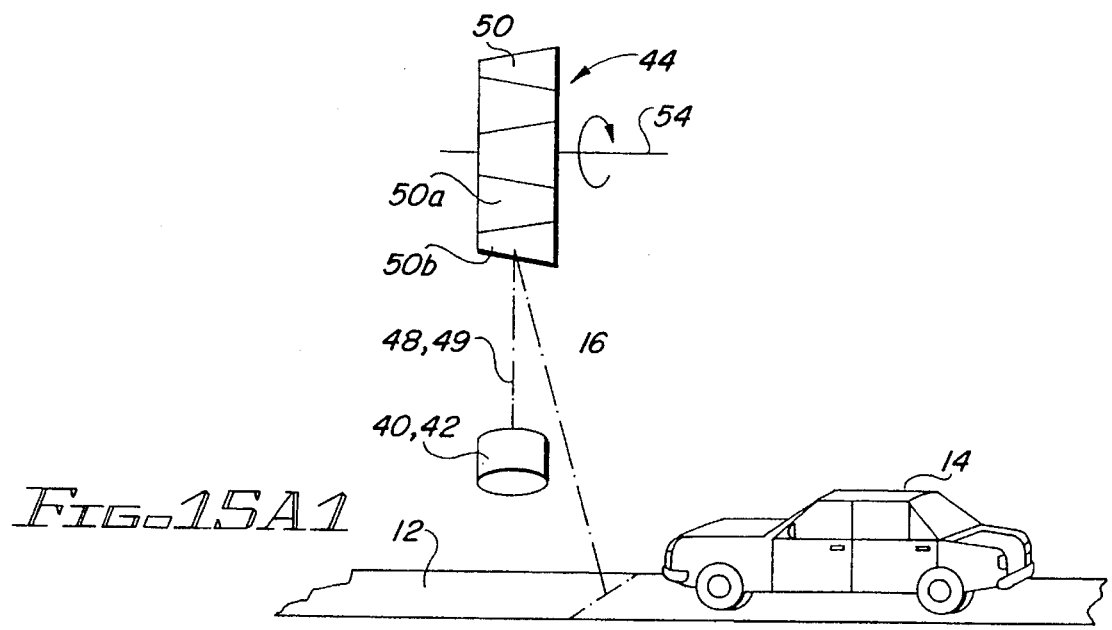
FIG.-15A1
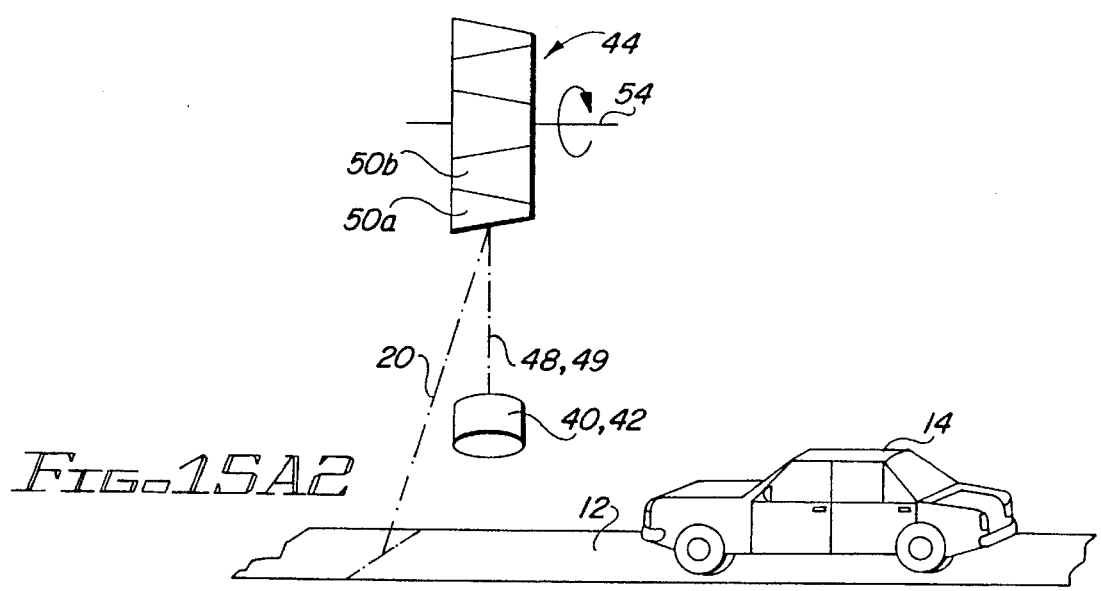
FIG.-15A2
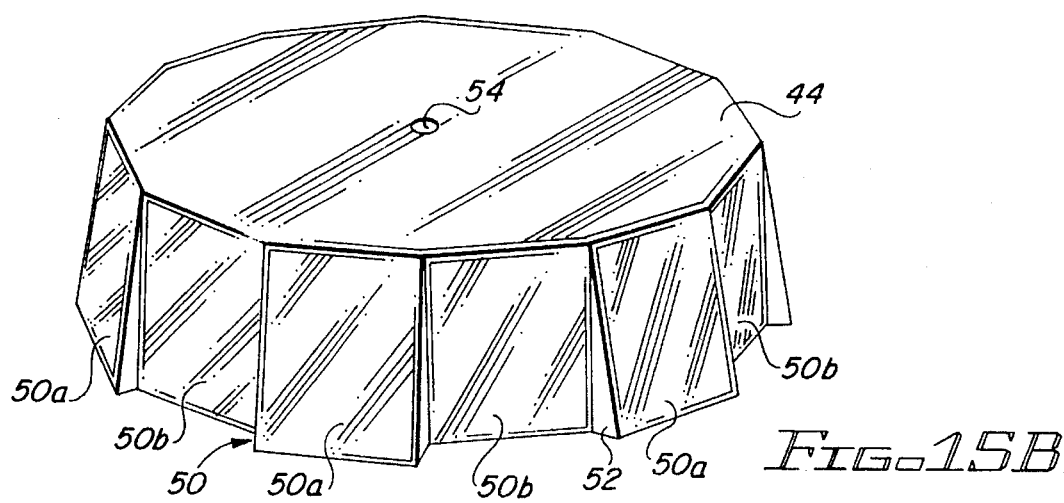
FIG.-15B

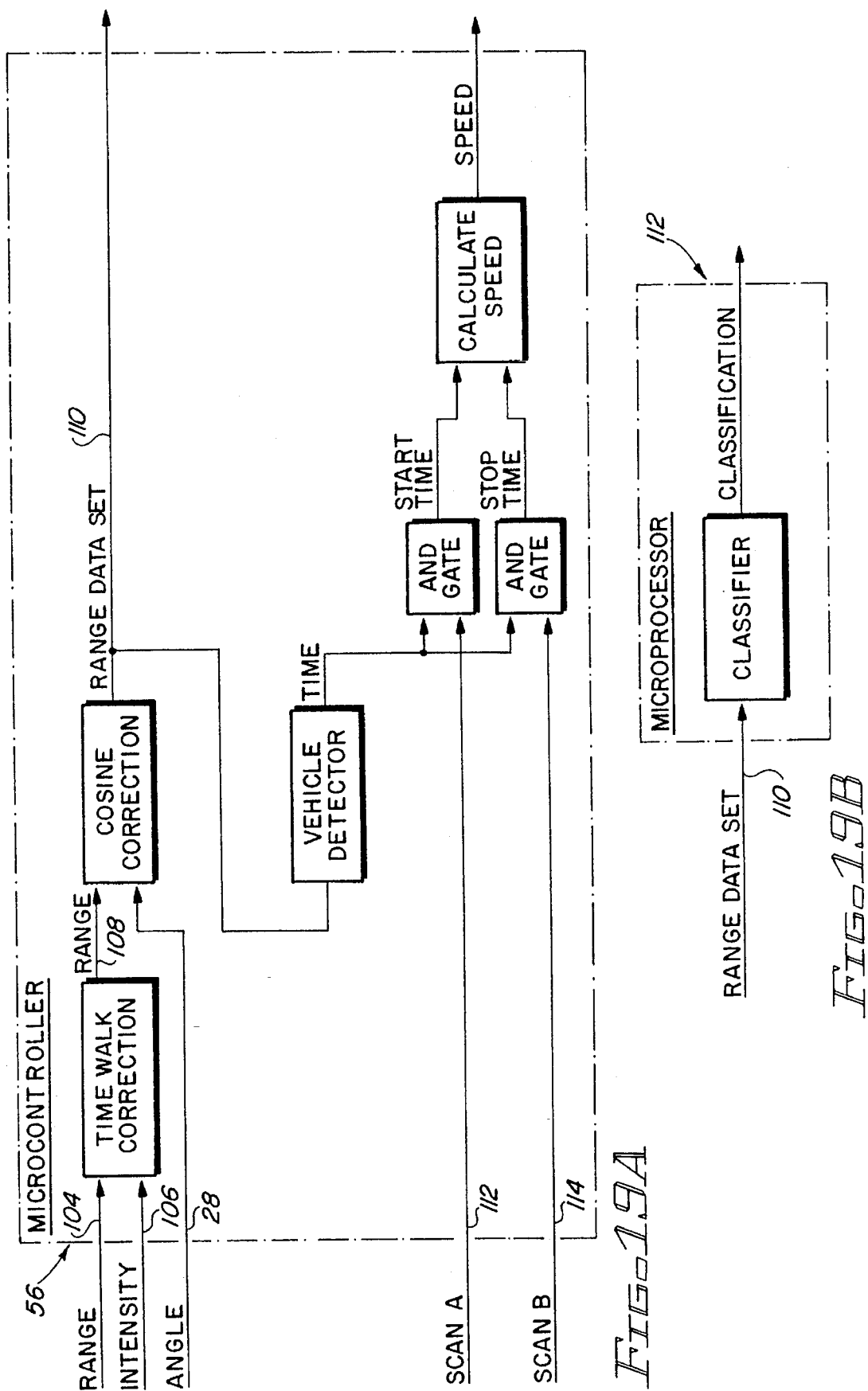

STRAIGHT TRUCK

3-AXLE TRACTOR SEMITRAILER

4-AXLE TRACTOR SEMITRAILER

5-AXLE TRACTOR SEMITRAILER

5-AXLE TRACTOR FLATBED TRAILER

5-AXLE TRACTOR TANK TRAILER

TWIN TRAILER (OR "DOUBLES")

ROCKY MOUNTAIN DOUBLES (ONLY IN CERTAIN STATES)

TRIPLE TRAILER (ONLY IN CERTAIN STATES)

TURNPIKE DOUBLES (ONLY IN CERTATAIN STATES)

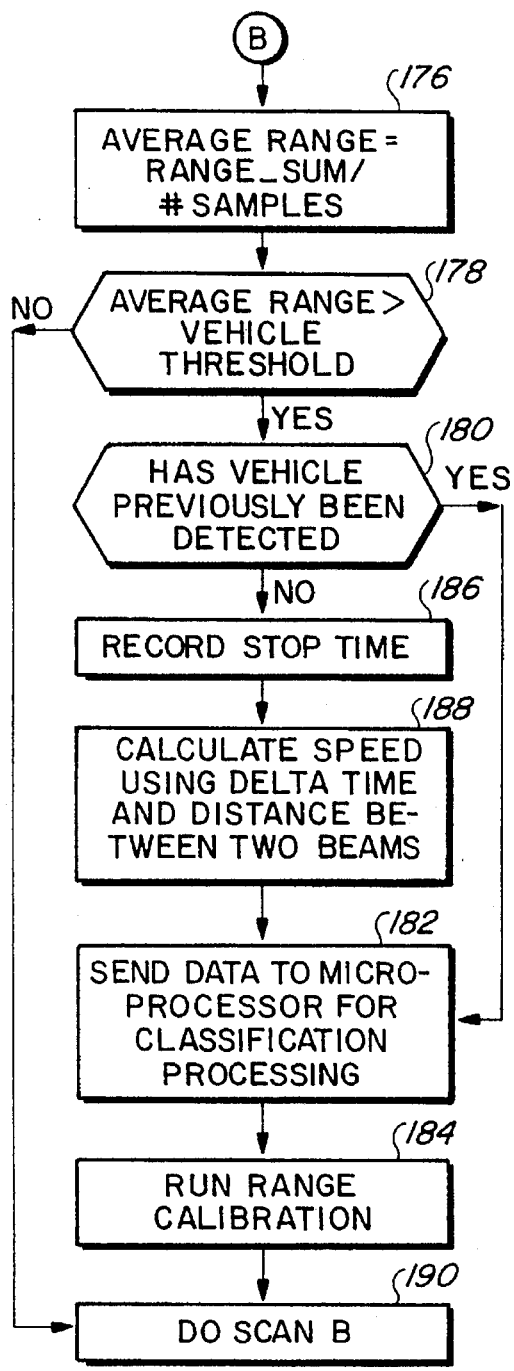

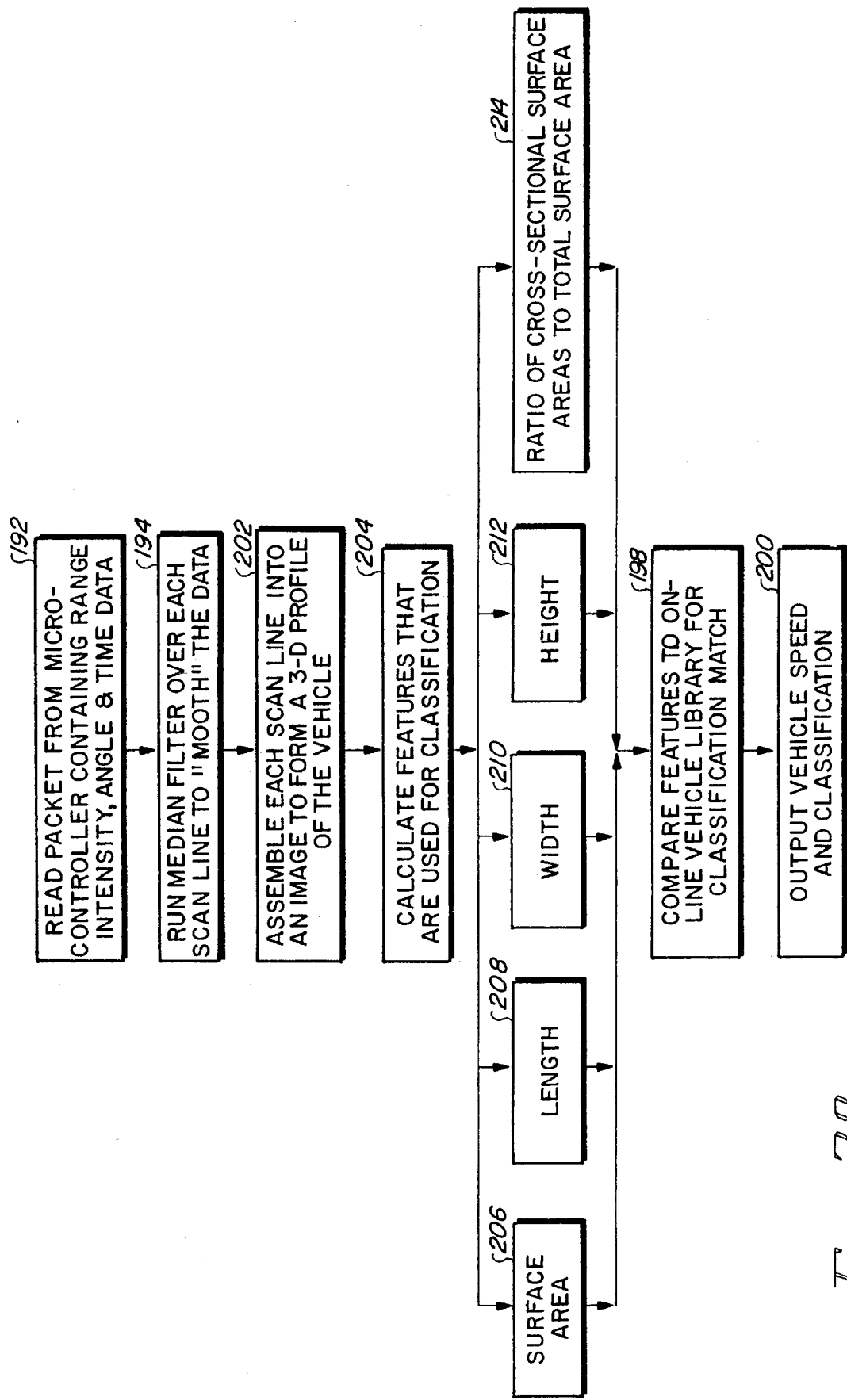

INTELLIGENT VEHICLE HIGHWAY SYSTEM SENSOR AND METHOD

CROSS REFERENCE TO RELATED APPLICATIONS

This application is a continuation-in-part of application Ser. No. 07/980,273 filed Nov. 23, 1992 for an Active Near-Field Object Sensor and Method Employing Object Classification Techniques, issuing as U.S. Pat. No. 5,321,490 on Jun. 14, 1994, and application Ser. No. 07/997,737 filed Dec. 30, 1992 for an Object Sensor and Method For Use In Controlling An Agricultural Sprayer issuing as U.S. Pat. No. 5,278,423 on Jan. 11, 1994, both of which are commonly assigned with the present invention.

BACKGROUND OF THE INVENTION

1. Field of the Invention

The present invention relates generally to object sensors and related methods, and in particular relates to electronic object sensors and methods useful in detecting vehicle speed and shape for classification and input to Intelligent Vehicle Highway Systems (IVHS).

2. Background Art

A vehicle sensor providing the presence of a vehicle in a traffic lane and indicating the vehicle speed as it passed the sensor is disclosed in copending application Ser. No. 07/980,273 referenced above. A time-of-flight laser range finder concept is used which measures the normal distance to a highway from a fixed point above the road surface and then measures the distance to any vehicle which either passes or stops under the sensor. The concept teaches the use of two laser beams pulsing at a high rate projected across the road surface at a fixed angle between them. Because of the high repetition rate, the system is also able to determine vehicle speed with an accuracy within one mph and using this calculated speed, develop a longitudinal profile of the vehicle using consecutive range measurements as the vehicle moves under the sensor.

The principal goals of the invention are to provide active near-field object sensors which are relatively low in cost, are accurate and have utility in a wide variety of applications. The invention contemplated a sensor for detecting the presence of an object within an area located in a close range to the sensor, and includes a range finder having means for emitting a directional output of pulsed energy toward the fixed area. In a preferred arrangement, the emitting means comprises a laser diode capable of emitting pulses of coherent infrared radiation, which are used together with collimating optics and a beam spliter to provide two diverging output beams directed toward the near-field area under observation.

The sensor also includes means for receiving a portion of the energy reflected from either the area, or an object located within the area. The returned pulse energy is then provided as an input to a receiver for determining a time of flight change for pulses between the emitting and receiving means, which may be caused by the presence of an object within the area. The sensor is also provided with various features useful in providing outputs which indicate either the speed, census, size or shape of one or more objects in the area. For example, the sensor is provided with means for receiving an input from the time of flight determining means and for providing an output indicating whether the object meets one of a plurality of classification criteria (e.g., is the object an automobile, truck or motorcycle). To achieve these and other objectives, the receiving means includes two detectors, with means for alternately selecting between the outputs of the two detectors for providing inputs to the time of flight determining means; means are also provided for measuring the time interval between interceptions of the two diverging outputs by a given object, so as to calculate the speed of the object passing through the area.

Copending application Ser. No. 07/997,737 referenced above discloses the generation of three dimensional images of objects by rotating or scanning a laser beam rangefinder, operating at a high pulse rate, in a plane where there is relative motion between the rangefinder and the object to be sensed or imaged in a direction perpendicular to the laser beam plane of rotation. This operation causes the laser rangefinder rotating beam, when passing to a side of the object, to cover the object to be sensed with rangefinder pulses, and thereby, obtain a three dimensional image of the object.

A preferred embodiment of the three dimensional object sensor taught in the copending application taught the sensing of trees formed in a row for purposes of spraying, counting or measuring the size of the trees. The sensor is moved along the ground traveling between rows of trees, crops or foliage with the laser rangefinder scanning on either side of the moving vehicle carrying the sensor in a plane perpendicular to the motion of the vehicle. When the sensor detects the presence of foliage, it provides a signal activating a spraying system for the efficient spraying of the tree or object being sensed. This operation ensures that spraying takes place only when there is foliage present to intercept the sprayed materials. Economic and environmental benefit is thus realized.

The agricultural sprayer employs a pulsed time-of-flight range measuring system having separate apertures for the laser transmitter and receiver. The laser beam and receiver field-of-view are continuously scanned, by a rotating mirror, in a vertical plane which is perpendicular to the forward motion axis of the sprayer vehicle. The position of the mirror, and correspondingly the laser beam, is determined by means of a shaft encoder attached to the mirror drive motor shaft. With this embodiment, a single sensor makes range measurements on both sides of the sprayer vehicle as the vehicle moves the sensor between rows of trees. Since the sensor only need to detect the presence of trees, range measurements are only made within elevation angles of plus and minus 45 degrees on each side of the sensor. Data is collected within 180 degrees out of the 360 degrees of a revolution or circular scan. As the sprayer vehicle moves along, the scan trace advances on consecutive revolutions of the mirror. Employing a distance traveled input from the vehicle, the sensor creates a panorama of images. An algorithm then determines whether trees are present from the measured range data as a function angle. Spray units are grouped in zones and the sensor provides foliage images for the zones and thus an indication of the amount of spray necessary for a particular tree zone.

There is a continuing demand for accurate, low-cost sensors useful in a wide variety of applications, including equipment used in the home, as well as for security, military and transportation applications. There have been suggestions for traffic signal controllers utilizing overhead sensors. Copending application makes reference to the following U.S. Pat. Nos.: 3,167,739 to Girard et al; 3,436,540 to Lamorlett; 3,516,056 to Matthews; 3,532,886 to Kruger et al; 3,680,047 to Perlman; and 4,317,117 to Chasek.

Likewise referenced, near-field sensors have also been utilized as intruder alarms and as automatic door operators.

Examples of such arrangements are disclosed in the following U.S. Pat. Nos.: 3,605,082 to Matthews; 3,644;917 to Perlman; 3,719,938 to Perlman; 3,852,592 to Scoville et al; 3,972,021 to Leitz et al; and 4,433,328 to Saphir et al.

As discussed in the three dimensional sensor copending application, U.S. Pat. No. 4,768,713 discloses the use of an ultrasonic sonar-type sensor to detect the presence of tree foliage, as do U.S. Pat. No. 4,823,268 and U.S. Pat. No. 5,172,861. Optical dimensioning techniques have been incorporated in industrial uses as disclosed in U.S. Pat. No. 4,179,216 and U.S. Pat. No. 4,490,038.

As discussed in the copending applications, the object sensors were developed by the inventors as an outgrowth of several laser systems developed for Department of Defense and Department of Transportation programs. Typically military use of laser optics and electronics are found in missile systems and target recognition systems. Target images are produced and are seen as a missile or carrier flies over a targeting area. For example, a missile may be equipped with a laser range finder scanning in a plane perpendicular to the flight path.

SUMMARY OF INVENTION

A laser sensor for detecting vehicles and providing outputs useful in determining a three dimensional shape and speed of the vehicle comprises laser means for determining a range from the sensor to portions of a vehicle wherein the vehicle travels within a sensing zone of the sensor and for providing respective range data outputs corresponding with a sensor angle for each range data output. Means for scanning the beams across the vehicle is provided, the scanning means providing means for determining the beam orientation and a corresponding sensor angle. In addition, means is provided for determining a distance traveled by the vehicle between locations within the zone. The travel distance provides data representing a distance traveled by each point on the vehicle. Means is also provided for processing the respective range, angle and travel distance data for determining the speed and three dimensional shape of the vehicle. The processing means provides vehicle classification useful in intelligent vehicle highway systems.

The sensor in a preferred embodiment comprises a forward and a backward beam emitted by the laser means. The forward and backward beams are separated by a predetermined angle and are emitted toward a fixed area through which the vehicle travels. A time signal representative of a travel time for a point on the vehicle to travel between the beams is determined from time-of-flight data provided by the range data processing means. A single tranmitter and receiver pair is used in a preferred embodiment of the present invention. In an alternate embodiment, a sensor further comprises two transmitters for emitting a pair of laser beams, means for directing the beams toward zones on a roadway traveled on by the vehicle, and two receivers for converting reflected laser beams from the vehicle to signal voltages, the signal voltages representative of ranges between the receivers and defined points on the vehicle.

Scanning is provided using an optically reflective surface intercepting the beams and reflecting the beams at predetermined angles from a perpendicular to the roadway. The beams reflected off of the vehicle are directed back toward the mirror into corresponding apertures of the receivers. Means are provided for rotatably moving the reflective surface across a reflective angle sufficient for reflecting the beams across a transverse portion of the vehicle, and signal means representative of the sensor angle within the beam plane are also provided. The angle signals are delivered to the processing means for providing range data at corresponding angles and the range and angle data in combination provide a transverse profile of the vehicle.

In one embodiment, the scanning is provide using a mirror intercepting the beam emitted from the transmitter and reflecting the beam onto scanning planes. The planes are set at opposing angles from a perpendicular to the roadway. The reflected beam directed back toward the mirror is directed into corresponding apertures of the receiver. A motor having a rotatable shaft is affixed to the mirror for continuously rotating the mirror about the axis, and an encoder is affixed to the motor shaft for identifying an angular position of the mirror relative to a reference angle.

In the preferred embodiment of the present invention, the processing means comprises a microprocessor programmed to receive respective range and sensor angle data for storing and processing the data for a scanned cycle associated with a timing signal. The processed data results in a three dimensional shape profile for the vehicle. Further, the invention comprises an algorithm for comparing the vehicle shape profile with a multiplicity of predetermined vehicle shapes for classifying the vehicle.

It is an object of the present invention to improve upon the vehicle sensor of the copending application by providing a capability of developing a complete three dimensional profile of the vehicle as it passes beneath the sensor by extending the technology of the three dimensional agricultural sprayer sensor to the vehicle sensor. An algorithm of the present invention takes the three dimensional vehicle profile and compares it to known vehicle profiles for categorizing the vehicle into classes for use in automatic toll collecting, highway usage data compilation, ferry boat loading direction and the multiplicity of uses needed in the Intelligent Vehicle Highway Systems.

A strategic plan for Intelligent Vehicle Highway Systems in the United States was prepared in Report No: IVHS-AMER-92-3 by IVHS America and published on May 20, 1992. The document was produced, in part, under U.S. DOT, Contract Number DTFH 61-91-C-00034. The purpose of the strategic plan is to guide development and deployment of IVHS in the United States. The plan points out that there is no single answer to the set of complex problems confronting our highway systems, but the group of technologies known as IVHS can help tremendously in meeting the goals of the Intermodal Surface Transportation Efficiency Act of 1991 (ISTEA). The purpose of ISTEA is " . . . to develop a National Intermodal Transportation System that is economically sound, provides the foundation for the Nation to compete in the global economy, and will move people and goods in an energy efficient manner." It is an object of the present invention to satisfy needs identified within the ISTEA goals. The IVHS America plan describes these needs, one of which is Automated Vehicle Classification (ARC).

It is further an object of the invention to use a scanning laser radar system to develop a range map of an area being viewed. Two dimensions are provided by the scanning pattern and a third dimension is provided by the range measurements themselves. It is an object of the invention to improve upon the vehicle sensor of the copending application which uses a fixed rangefinder with a scanning system that scans across a lane of traffic using two divergent beams. It is further an object of the present invention to provide a profile of the vehicle using range reading taken in a transverse direction across the vehicle. Vehicle speed is determined from the times of intersection of the two beams by the vehicle. Vehicle speed provides spacing of the transverse cross sections of the vehicle to construct an accurate three dimensional vehicle profile for use in classifying the vehicle.

It is further an object of the invention to provide an algorithm having the ability to distinguish vehicles from clutter and to categorize the vehicles. It is further an object of the invention to provide information useful to other Intelligent Vehicle Highway Systems and the Electronic Toll and Traffic Management (ETTM) area, in particular to Automatic Toll Collection.

While particular exemplary embodiments are disclosed in both methods and apparatus for this invention, those of ordinary skill in the art will recognize numerous possible variations and modifications. All such variations are expected to come within the scope of the present invention.

BRIEF DESCRIPTION OF DRAWINGS

A complete and enabling disclosure of the present invention, including the best mode thereof, is directed to one of ordinary skill in the art in the present specification, including reference to the accompanying figures, in which:

FIGS. 9 and 10 are perspective views illustrating the operation of the active near-field object sensor in the copending application;

FIG. 11 is a block diagram illustrating the electronic and optics portions of the hardware used with the sensor of the copending invention referred to in FIGS. 9 and 10 above;

FIG. 12 illustrates scan geometry of the present invention for providing high accuracy laser radar with a three inch range resolution for a sensor mounted above a passing vehicle;

FIG. 13 is a perspective view illustrating a three dimensional vehicle profile provided by the present invention;

FIG. 14 is a block diagram illustrating the electronic and optics portion of the hardware used with the IVHS sensor of the present invention;

FIGS. 15A1 and 15A2 illustrate functional representations of a multi faceted mirror used in one embodiment of the present invention wherein the rotating mirror has facets of alternating inclination for reflecting an incident beam into a forward beam and a backward beam;

FIG. 15B is a perspective view of the multi faceted mirror of FIG. 15A;

FIG. 16 illustrates the forward scanning laser beam and backward scanning laser beam geometry used in the preferred embodiment of the invention;

FIG. 19A and 19B are block diagrams illustrating the functional flow of the microcontroller and microprocessor, respectively, for the present invention;

FIGS. 22 through 28 are interrelated flow charts illustrating a preferred embodiment of the software useful with the present invention.

DETAILED DESCRIPTION OF PREFERRED EMBODIMENT

Figure 1:
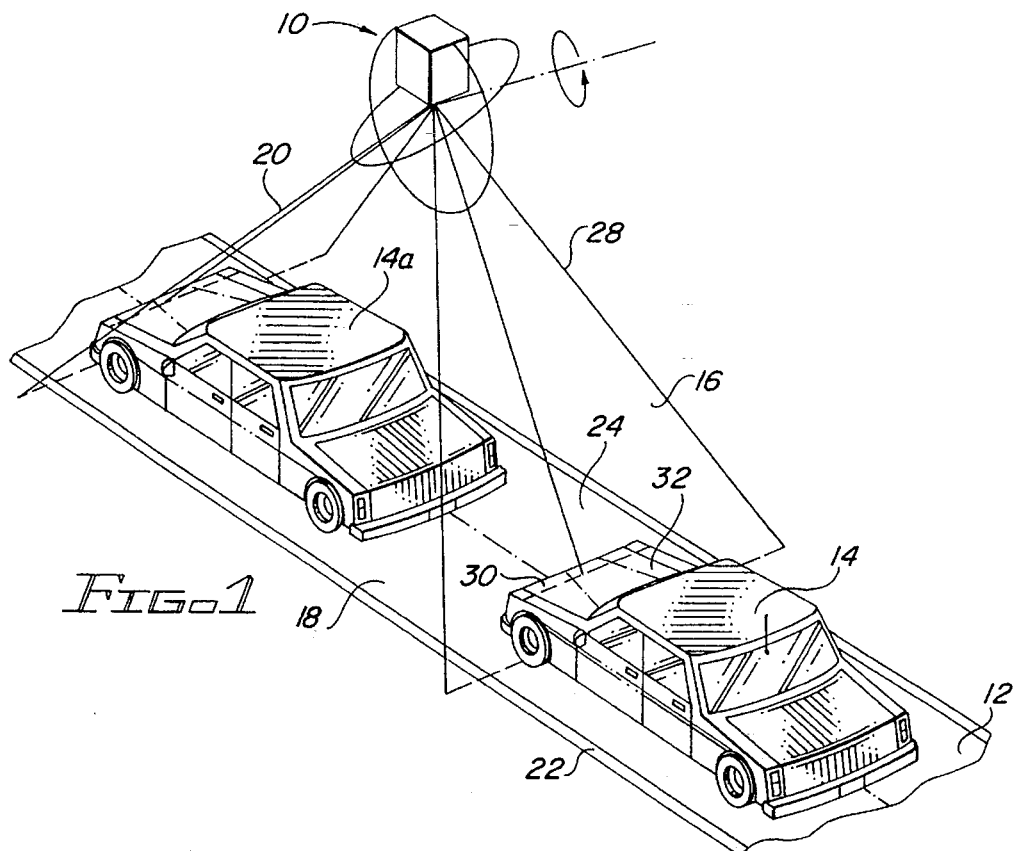
FIG. 1 is a partial perspective view illustrating the operation of the sensor in the preferred embodiment including forward and backward scanned laser beams for intercepting a vehicle as it passes through the beams.

In the preferred embodiment of the invention, a sensor 10 is affixed above a highway 12 for sensing a vehicle 14 passing below the sensor 10. FIG. 1 illustrates a forward scanned beam 16 intercepting the vehicle 14 as the vehicle 14 begins to pass through an area 18 below the sensor 10 and a backward scanned beam 20 intercepting the vehicle 14a as the vehicle 14a leaves the sensor area 18. The invention concerns both the method and apparatus used to sense vehicles 14 for determining a vehicle speed and vehicle classification.

As discussed in the earlier sections of this specification, dependence is placed on disclosure in copending applications. To provide a clear reference to elements of the copending inventions, reference numerals for elements described in copending application Ser. No. 07/980,273 for the Active Near-Field Object Sensor Classification Techniques will use copending application numbers increased by 300 and copending application Ser. No. 07/997,737 for Object Sensor and Method For Use In Controlling An Agricultural Sprayer will use copending application numbers increased by 500. For example, the sensor of present invention is referred to as sensor 10 and when referenced, the sensors of above copending applications will be referred to respectively as sensor 310 and sensor 510. Likewise, all referenced numbers will be increases accordingly when appropriate.

Figure 2:
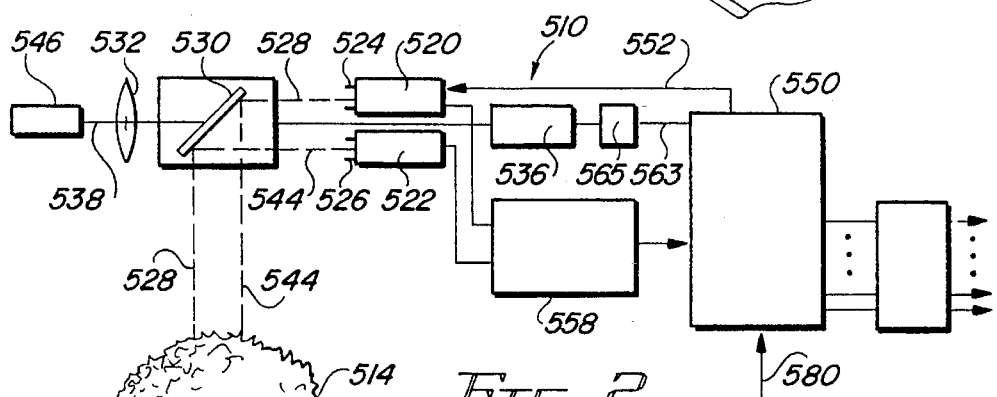
FIG. 2 is a schematic diagram of the object sensor used in the copending application illustrating functional flow relationship of the sensor elements on the copending invention used in an agricultural sprayer.
Figure 3:
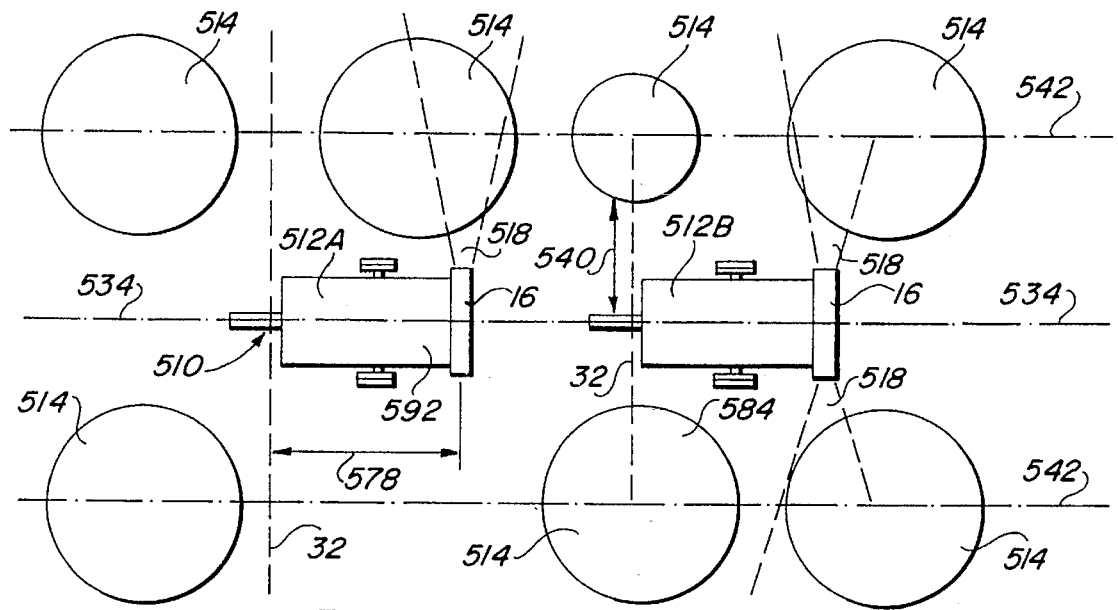
FIG. 3 is a partial aerial view illustrating various positions of the agricultural sprayer of the copending application traveling between rows of target trees.

With reference to copending application Ser. No. 07/997, 737 the sensor 510 as illustrated in FIG. 2 employs a pulsed time-of-flight range measuring system. A laser transmitter 520 and optical receiver 522 having separate apertures 524 and 526 respectively are placed side-by-side as illustrated in FIG. 2. The transmitted laser beam 528 and receiver 522 field-of-view are continuously scanned by a rotating mirror 530 in a vertical plane 532 which is perpendicular to a travel axis 534 of a sprayer 512 upon which the sensor 510 is affixed as illustrated in FIG. 3. Again with reference to FIG. 2, the position of the mirror 530 and correspondingly, the laser beam 528 is determined by means of a shaft encoder 536 affixed to the mirror drive motor shaft 538. With this configuration, a single sensor 510 makes measurements of ranges 540 between the sensor 510 and target trees 514 on both sides of the agricultural sprayer as it travels between rows 542 of target trees 514 or other crops. FIG. 3 illustrates this by showing a partial aerial view of a sprayer 512 at a first location 512A and a second location 512B between the rows 542.

Figure 2A:
FIG. 2A is a schematic diagram of the laser transmitter illustrating the relationship between the laser device and the lens/prism system.

As illustrated in FIG. 2A, the laser transmitter 520 lens system and circuitry employs a diode laser 519 as an optical source. By way of example, a conventional InGaAs strained layer quantum-well-structure injection laser 519 configured in a pulsed circuit is used to emit 13 nanosecond pulses having a peak radiant flux of approximately thirty watts at 0.91 microns. The diode laser 519 is driven with fifty amp current pulses generated by an avalanche-transistor pulser well known in the art. The 381 micron laser 519 diode junction emits radiation into a 10 by 40 solid angle. A fast focal length (f:0.91) multi element lens 521 having an effective focal length of, for example, on the order of 8.8 millimeters is used to collimate the diode laser emission, resulting in a beam divergence of 46.6 miliradians parallel to the diode junction and 0.12 miliradians perpendicular to the diode junction. The collimated laser beam is expanded by a factor of six in the direction parallel to the diode junction using an anamorphic prism 523 pair resulting in a 7.8 miliradians parallel and 0.12 miliradians beam divergence for the laser beam 528 emitted through the aperture 524.

Figure 2B:
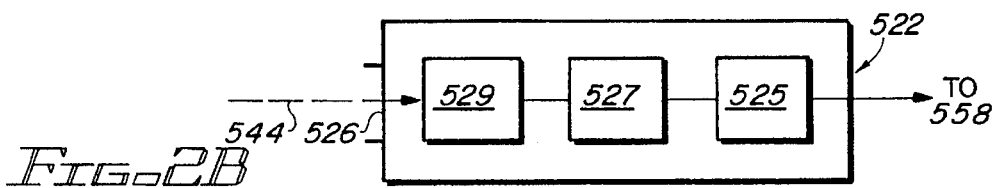
FIG. 2B is a schematic diagram of the optical receiver illustrating the relationship of the receiving objective lens and the photodiode converting the optical signal to current pulses which are then converted to a voltage signal using a conventional transimpedance amplifier.

As illustrated in FIG. 2B, the optical receiver 522 utilizes a lens system and circuitry comprising an objective lens 529 and a silicon PIN photodiode 527 receiving the laser beam 544 at its aperture 26 after it has been reflected from the target tree 514. A conventional transimpedance amplifier 525 converts the photodiode current pulses to voltage pulses. Optical return radiation representing the reflected laser beam 544 incident upon the objective lens 529 is focused onto the receiver 522 photodiode 527. The receiver field-of-view is given by the ratio of the photodiode 527 diameter to the receiver lens 529 focal length and, by way of example, may be on the order of 13 miliradians. This value is sufficiently large to facilitate bore sighting the receiver 522 to the 7.8 miliradians transmitter beam width.

Figure 4:
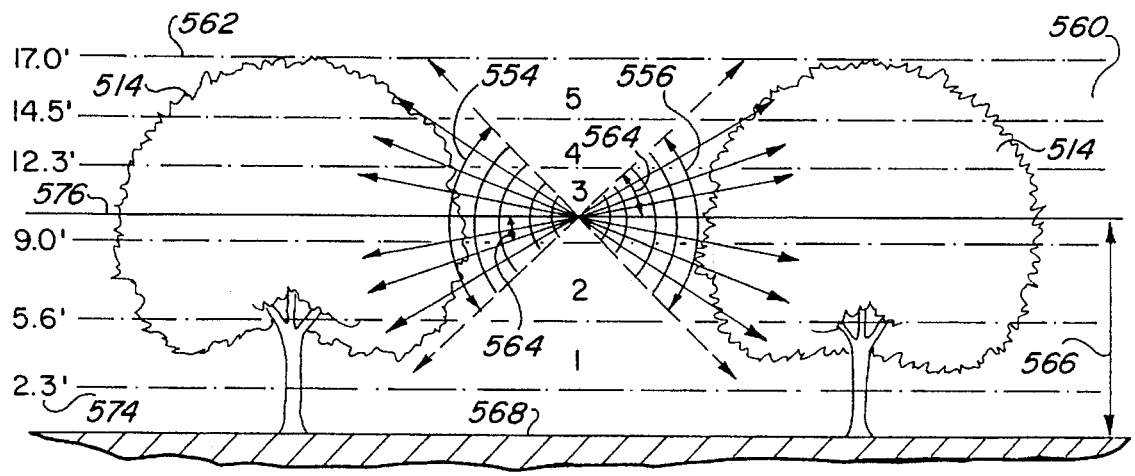
FIG. 4 illustrates the laser beam scanning of an exemplary set of identified zones used in the application of herbicides to citrus trees in a typical citrus grove.

Referring again to FIG. 2, the shaft encoder 536 used in the copending preferred embodiment pulses the laser 519 at a preselected pulse rate, for example, on the order of 2,048 pulses per revolution. This results in range measurements being made at every 3.06 miliradians about the axis 538 of the mirror rotation. With a motor 546 providing the mirror 530 rotation rate of 40 revolutions per second (rps), the laser pulse repetition rate is at 81.92 thousand cycles per second (kHz). In the copending preferred embodiment, an on-board styled microprocessor 550 is employed that limits the repetition rate to 15 kHz based on the microprocessor cycle time. The shaft encoder 536 delivers pulses at a rate of 512 pulses per revolution at an angular rotation rate of 29.29 rps. The microprocessor 550 controls the triggering of the laser transmitter 520 by sending pulse trigger signals 552 which are selected to limit the laser 520 operation to quadrants of rotation on the left and right sides of the sprayer 512 corresponding to tree height, a left scan quadrant 554 and a right scan quadrant 556 as illustrated in FIG. 4. The laser transmitter 520 is triggered 128 times in each of the preselected tree-occupied quadrants 554 and 556.

Figure 2C:
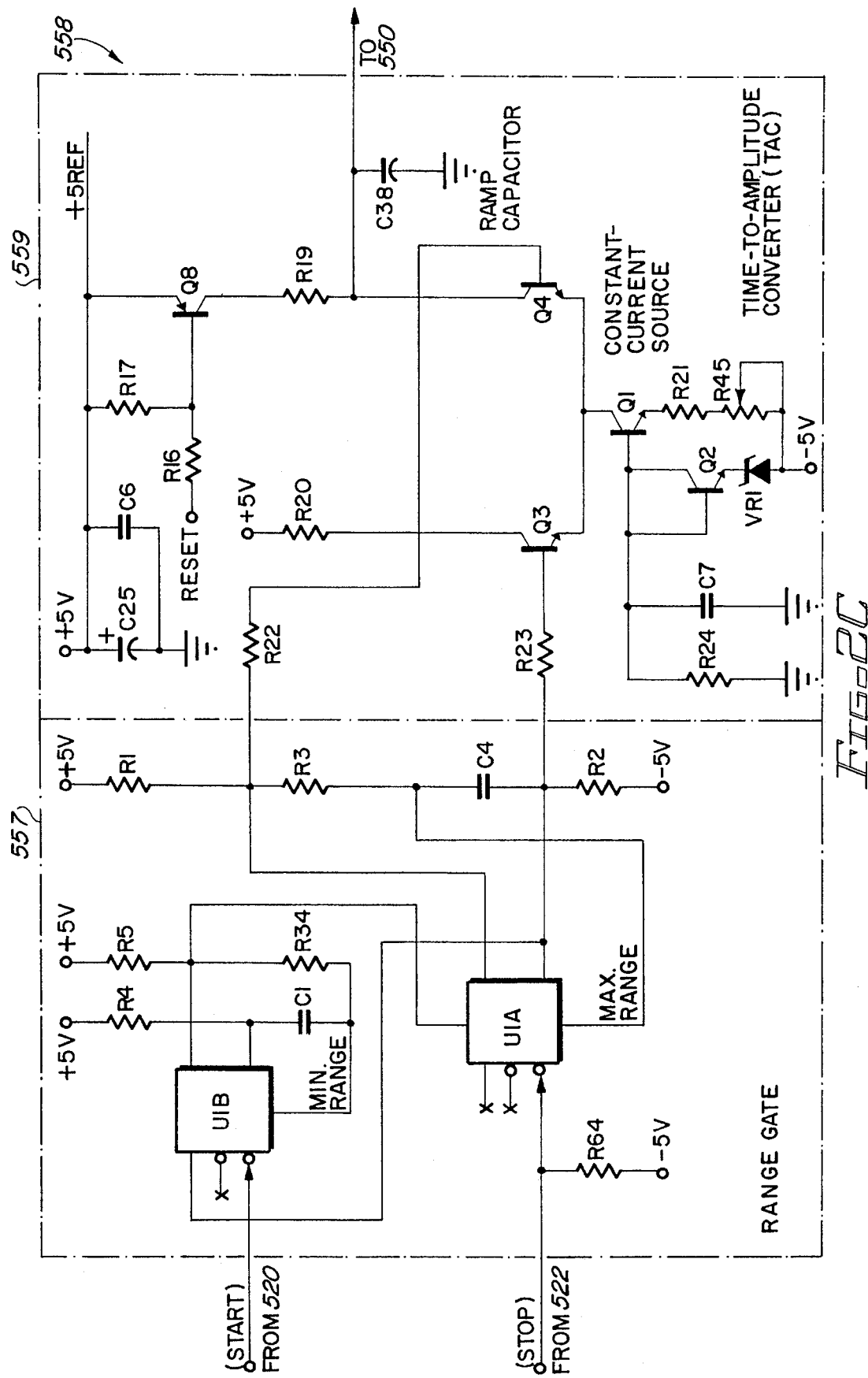
FIG. 2C is a schematic diagram of the time to amplitude circuitry used in the preferred embodiments of the inventions of the copending applications.

With continued reference to FIG. 2, the sensor 510 determines a range 540 by measuring the time for one emitted pulse as it leaves the laser transmitter 520 and returns to be detected by the optical receiver 522. This round trip time is divided by two to obtain the time to travel to the target tree 514 and multiplied by the speed of light, the speed of the laser beam 528. An accurate measure of the range 540 is required and thus an accurate measurement of the time is needed. To this end, the sensor system 510 of FIG. 2 includes a range measurement circuit 558 comprising a range gate 557 and an analog time-to-amplitude converter circuit (TAC) 559 as detailed in FIG. 2C. This range measurement circuit 558 is optically coupled to the laser 519 as means for initiating a start pulse for the range gate. A stop pulse for the range measurement circuit 558 is provided by a threshold detector contained within the receiver 522.

While it is appreciated by those skilled in the art that both digital and analog techniques may be used for making the time interval measurement in order to accurately measure the propagation time of the laser pulse to the target and back to the receiver, the analog technique was chosen in the copending invention because of its resolution, smaller size, simpler circuitry, lower power consumption and lower costs when compared with the digital technique. The analog range measurement technique specifically used in the present invention is known as a "time-of-flight converter" and has an accuracy of about one percent of measured range and a resolution of about plus or minus five centimeters.

Referring again to FIG. 2C, the specific forms of the range gate 557 and TAC 559 are shown and use a constant current source including transistor Q1 to charge a ramp capacitor C38 to obtain a linear voltage ramp whose instantaneous value is a measure of elapsed time. The TAC 559 circuit is designed so that the voltage across the capacitor C38 begins ramping down from the positive power supply when the laser 519 fires. The ramp is stopped when either a reflected pulse is received by the receiver 522 or at the end of a measured period of time. A maximum range and thus a maximum measured time period is preselected as an initial value. The output of the TAC 559 is then converted to a digital format by a ten bit analog-to-digital converter within the microprocessor 550.

In the copending sensor embodiment, the start timing pulse for the TAC 558 is generated by the shaft encoder 536 with a simultaneous pulse 552 causing the laser transmitter 520 to fire.

Referring again to FIG. 2, the microprocessor 550 is programmed to perform three primary tasks which include sensing and calculating tree foliage height 562, activating spray zones 560, and running sensor system diagnostics. To calculate the height 562 of a target tree 514, the range 540 to the tree 514, an angle 564 associated with that range 540, and the height 566 that the sensor is mounted above the ground 568. The microprocessor 550 provides various outputs to light emitting diodes, presence relays for indicating the presence of an object such as foliage, an RS232 computer interface and relays within the power supply. The microprocessor 550 receives inputs in addition to those described that include temperature and real time clock pulses. Backup power and circuitry is also included. Such input/output microprocessor information and backup circuitry is well known in the art.

Figure 5:
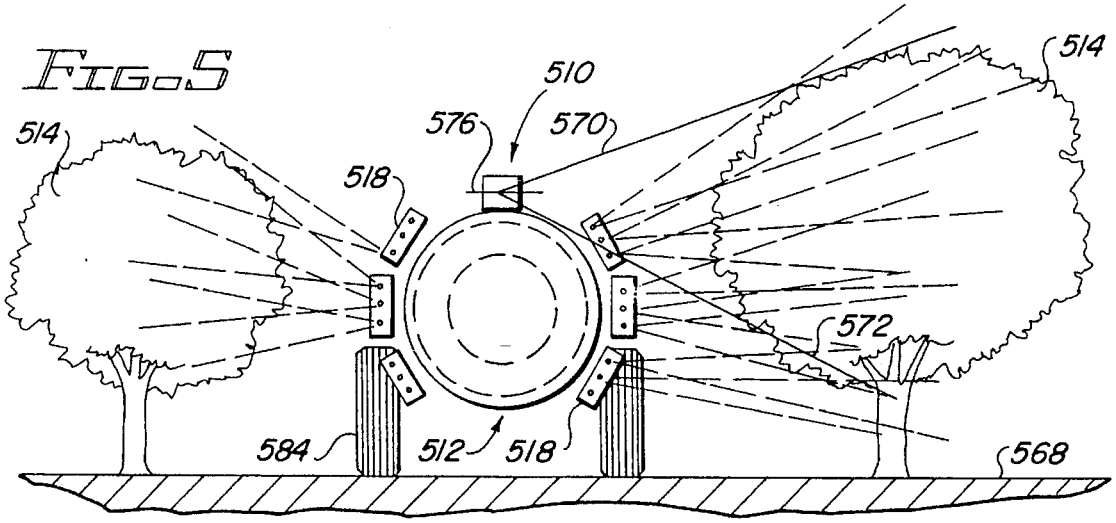
FIG. 5 is a partial rear view of an air-blast type agricultural sprayer illustrating the selective application of spray materials from selected nozzles to target trees.

As illustrated in FIG. 5, when the sensor 510 is scanning in the upward direction, the range 570 to the top of the tree 514 is defined as the last valid range received. The range 572 to the bottom of the tree is defined as the first valid range which produces a height above a minimum height threshold 574. When the sensor 510 is on a downward scan, the range 570 to the top of the tree 514 is defined as the first valid range received and the range 572 to the bottom of the tree 514 is defined as the last valid range which produces a height above a minimum height threshold 574. A valid range is any range 540 less than a predetermined maximum range. Each range 540 reading has a relative angle signal 563 associated with it with respect to the horizontal axis 576 for the copending preferred embodiment. This angle signal 563 is determined by a counter 565 that is incremented each time the shaft encoder 536 moves one cycle. In this copending preferred embodiment, the shaft encoder has 512 cycles per revolution. Therefore, one tick on the counter translates to an angle 564 of approximately 0.7 degrees and provides an angle signal 563 to the microprocessor 550.

Since the sensor 510 is mounted at a fixed height 566 above the ground 568, the height to the top 562 or bottom 572 of the target tree 514 can be calculated by multiplying the range 540 measured at a given angle 564 by the sine of that angle 564 and adding the height of the sensor 566 to that product.

A corresponding mathematical formula takes the form:

$$\text{Height(tree)} = \text{Height (sensor)} * \text{SIN (Angle)}$$

where the Range 540 is defined to be less than a predetermined maximum range and the angle 564 takes on predetermined values between −45 degrees and +45 degrees.

Figure 6:
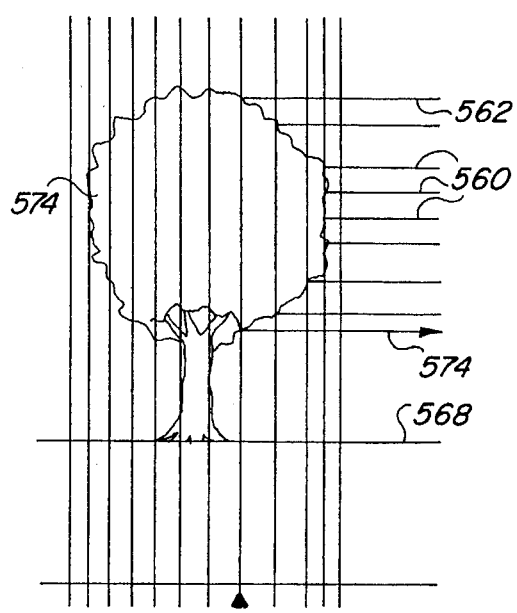
FIG. 6 illustrates the relationship between zones and tree size for a particular measurement location.

The agricultural sprayer 512 comprises spray heads in the form of controllable nozzles in the preferred embodiment. The heads 518 are aimed and grouped into zones 560 according to the particular task the sprayer 512. In the embodiment presently in use in a typical Florida orange grove, five zones are used with the top of the highest zone at approximately seventeen feet. The number of zones 560 and the size will vary based on the specific target crop or task. After the height 562 of a tree 514 is calculated, the appropriate zones are identified and the corresponding spray heads 518 are turned on. All appropriate zones 560 as illustrated in FIG. 4 between the bottom 574 and the top 562 of the target tree 514 will be turned on. As illustrated in FIGS. 4 and 5, only those zones 560 appropriate for a given target tree 517 are turned on for applying the spray materials. FIG. 6 further illustrates that only those zones 560 for the scanned measurement location 561 will be activated for spraying.

In this copending preferred embodiment, the laser sensor 510 is mounted on the sprayer 512 about sixteen feet forward of the spray heads 518 as illustrated in FIGS. 4 and 5. There is a time delay between the time the sensor 510 takes measurements of a target tree 514 and the time that the spray heads 518 reach the target tree 514 as illustrated in FIG. 3. The microprocessor 550 determines when the fixed distance 578 between the sensor 510 and heads 518 has been covered based on a distance pulse signal 580 from a sensor (shown in copending application drawings) communicating with a wheel 584 of the sprayer 512. The data indicating which spray zones 560 to activate is stored in the microprocessor 550 in a circular queue styled data structure 600 as illustrated in schematic form in FIG. 7. When the distance pulse 580 is received, the current zone data is stored in the queue 600 at a current pointer 586 location. The queue pointer 586 is then incremented each time a distance pulse 580 is received by the microprocessor 550. In the case of the preferred embodiment, when the sprayer 512 has traveled sixteen feet, the time-delayed zone data is read from the queue and used to activate the spray heads 518. The preferred embodiment comprises electronically switchable solenoids affixed proximate to the spray heads 518 for controlling flow lines to the heads 518. The lines are connected to a holding tank 592 containing appropriate spray material mixtures for the task at hand.

After initializing the microprocessor 550, range 540 and angle 564 data is stored for subsequent target tree 517 height calculations. Based on the tree heights measured and the established spray zones 560, sprayer heads 518 communicating with the storage tank 592 are activated and release the selected spray material. This process is illustrated in FIG. 8 showing a top level flow chart designated 700.

Figure 8:
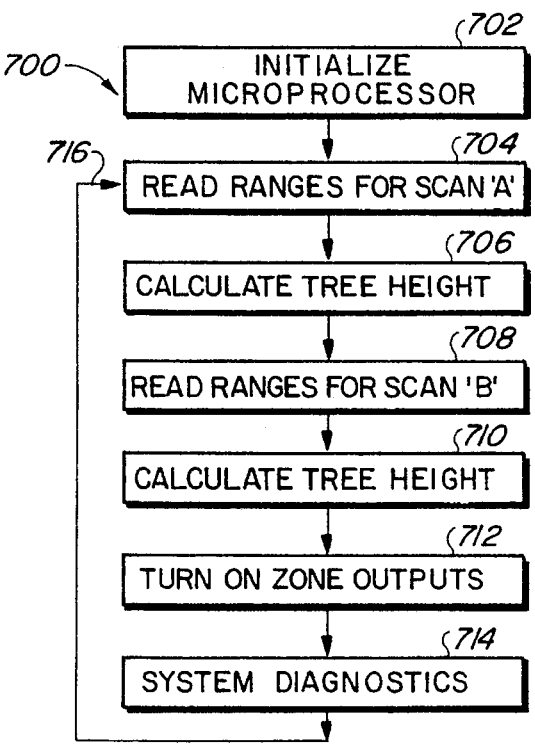
FIG. 8 is a sensor top level flow chart of the copending microprocessor software illustrating the steps from initializing to initiating spray application signals.

Referring to FIG. 8, it is seen that the microprocessor 550 is first initialized 702. After a scanning of the laser sensor 510, a range including time-of-flight distance and corresponding angle are read 704 and stored in the microprocessor 550. Using the above described formula, a tree height is calculated 706 from the measured range. The sensor height 566 is input as an initial value. This process of scanning continues 708 and heights calculated 710 so that the predetermined spray zones can be activated 712. In addition to the range calculations and initiating of spraying for recognized foliage zones, a system diagnostic is generated 714 and fed back to the start of the scanning cycle as means for resetting or sending a signal to a sprayer operator.

As discussed earlier, the microprocessor 550 is initialized 702 with information comprising the sensor height 566, a maximum range and a minimum range to be considered, and angles that correspond to designated spray zones 560. In the illustrated embodiment of FIG. 4, a forty five degree angle above and below the horizontal 576 has been predetermined for establishing the limits where range data is to be taken. These initial values are selected based on the given scenario for the spraying task at hand. As discussed, the microprocessor 550 also provides system diagnostics 714 which by way of example provide a failure warning indicating to the sprayer operator that a failure exists in the system, as an example, a malfunction in the laser. In the illustrated embodiment, a reference direction is selected to be vertically downward. This direction is identified in the software as a "z" pulse. Once the z pulse is received, the processor waits for an indication that the scan has passed through a forty five degree angle in the counter clockwise direction for this illustration. This 45 angle corresponds to the range to the bottom of the tree 572 as earlier described. FIG. 5 illustrates this range 572. This angle is preselected as that angle which will enable the laser to fire. A range is read and the range and corresponding angle are stored if the range is less than the initialized predetermined range. Once the measures range has been stored or if the measured range exceed the maximum, the sensor 510 is scanned through another incremental angle. This process of reading, comparing and storing continues until the scanning completes a 90 degree arc as measured from the 45 degree arc that caused the laser to be enabled.

Again with reference to FIG. 4, after the scanner passes through the 90 degree arc designated to be the right scan quadrant 556, the laser is disabled. The range and angle measurements made are used to calculate tree height for each incremented angle as earlier described. The various heights measured are compared to initialized predetermined spray zone heights for identifying those zones that are to be turned on. In the embodiment illustrated, five vertical zones were identified as being appropriate for the task. As illustrated in FIG. 4, zones 560 were selected between 2.3 feet, 5.6 feet, 9.0 feet, 12.3 feet, 14.6 feet and a maximum of 17.0 feet. It is these zone heights that are compared and used to determine when a particular zone 560 is to be turned on for application of the selected spray material.

Before the laser is again fired for taking range measurements, the sensor 510 is scanned through another 90 degrees as illustrated in FIG. 4. The laser is fired and a similar range measurement process is initiated for the left scan quadrant 554. The laser is enabled 504 and a reference established 506 for measuring a next valid range. Once established, the reference is incremented. A range is read in the left quadrant 554 in a similar manner to that described for the right quadrant 556.

As discussed earlier, when the sensor 510 is scanning in the upward direction as for example in the right scan quadrant, the range 570 to the top of the tree 514 is defined as the last valid range received. The range 572 to the bottom of the tree is defined as the first valid range which produces a height above a minimum height threshold 574. When the sensor 510 is on a downward scan as it is during the scanning in the left scan quadrant, the range 570 to the top of the tree 514 is defined as the first valid range received and the range 572 to the bottom of the tree 514 is defined as the last valid range which produces a height above a minimum height threshold 574. A valid range is any range 540 less than a predetermined maximum range.

Ranges and angles are stored if they are determined to be within the maximum identified range. Once the range data is stored or determined to be at the maximum range, the scanning angle is incremented and the reading cycle continues until the 90 degree arc is scanned.

Once the left scan quadrant 554 has been scanned completely, the laser is disabled and the stored data is used to calculate tree heights and corresponding zones as described earlier for the right scan quadrant 556.

The microprocessor 550 monitors the operation of the sensor 510 and indicates a failure by turning on status lights on an operator control panel (not shown). It is contemplated that the data obtained in the preferred embodiment will also be used for counting the target trees 517 being sprayed, calculating the speed of the sprayer 512 and using this information to control variable flow heads, determining acreage sprayed, and for false-color imaging well known in the laser imaging art. The entire grove is then mapped for future production accounting and analysis.

With reference to copending application Ser. No. 07/980, 273, a sensor in accordance with the copending invention is referred to generally by the reference numeral 310, and illustrated in FIGS. 7 and 8. The sensor 310 employs a compact enclosure 312 of light-weight material, such as aluminum. Across one side of the enclosure 312 is a transmissive window 320, which is shielded from ambient weather by a hood 318.

A preferred form of the electro-optical assembly fitted within the enclosure 312 is depicted in a schematic, block diagram format in FIG. 3 and referred to there generally by the reference numeral 328. The electrical-optical assembly includes a transmitter section 330, a receiver section 332, a range/processor section 334 and a power supply 336, each of which is discussed in detail in copending application Ser. No. 07/980,273 and highlighted below.

The transmitter section 330 includes an astable multivibrator 602 generating a laser trigger pulse at a nominal repetition frequency of 3 kilohertz to a laser driver 604 which, by way of example, produces a 20 ampere peak current pulse with a 4 nanosecond rise time, and a ten nanosecond pulse width. The output of the laser driver controls a laser diode 606, which preferably comprises an indium gallium arsenide injection laser diode array having an output on the order of 180 watts, at the 20 ampere pulse current defined by the driver 604. This diode emits an output at 905 manometers, which has been found to be an ideal wavelength for the silicon photodiode receiver, discussed below. It is also preferred that the array of the laser diode 606 have a junction characterized by dimensions of about 3.96 millimeters by 0.002 millimeters, in order to emit radiation in a 10 degree by 40 degree solid angle.

The output of the laser diode array 606 is collected by a fast (F/1.6) multi-element optical lens 608 which has an effective focal length of 24 millimeters and which is used to collimate the diode laser emission, the resulting collimated beam passes through a dual-wedge prism 610. By way of example, the resulting beam has a divergence of 3.96/24= 165 mrad parallel to the diode junction and 0.002/24=0.083 mrad perpendicular to the diode junction. The two outputs of the dual-wedge prism 610 are referred to by reference numerals 322 and 324. Both outputs are passed through the heated transmissive window 320.

In order to generate the high voltage necessary to pulse the laser diode 606, a 200 volt DC-DC converter 612 is provided in the transmitter section 330 and preferably is contained within an aluminum enclosure (not shown) to reduce electrical interference.

The transmitter section 330 further includes an optical fiber 614 coupled to receive a simultaneous output from the laser diode 606 with the emission into the lens 608. The output passing through the optical fiber 314 provides a significant aspect of the copending invention, as is discussed in greater detail below with reference to the range/processor section 334.

The receiver section 332 includes lens 622 for receiving reflected returning energy from the two pulsed output beams 322 and 324 emitted by the transmitter section 330. The energy passing through the lens 622 is passed through an optical filter G24, and the single input from the lens 622 filter 624 is fed into two photodetectors 626, 628 each of which provides an input to a respective amplifier 627 and 629 both of which provide an input to an analog multiplexer 632. It will be seen later that the present invention performs an optical multiplexing in a preferred embodiment of the invention. In the copending invention, the optical energy received in the lens 622 is first converted into an equivalent electronic analog of the input radiation and second into a logic-level signal. The outputs of the two photodetectors 626 and 628 are time-multiplexed by the high-speed analog multiplexer 632, which is controlled by a logic-level control line 633 from the microprocessor 652 contained within the range/processor section 334. The output of the multiplexer 632 is connected to a threshold detector 636 and an amplifier 634, both of which provide inputs to the range/processor section, as described below.

Preferably the two photodetectors 626 and 628 are silicon photodiodes which operate as current sources, with the associated amplifiers 627 and 629 converting the current pulses of the photo detectors 626 and 628 into voltage pulses. Each amplifier 627 and 629 offers a transimpedance of 28 kilohms when operated in a differential mode.

The optical filter 624 preferably has a narrow-band (on the order of 40 nanometers) width, which limits the solar radiance and permits only the 904 nanometer radiation to reach the photodetectors 626 and 628. Typically, the transmission of the narrow-band filter 624 is on the order of about 75 percent at 904 nanometers.

Although not shown, it is preferred that the analog portion of the receiver section 332 be contained within a faraday shield which permits the circuit to operate in a "field-free" region where the gain is achieved without additional noise reduction.

The range/processor section 334 includes a detector 642 optically coupled with the fiber 614, an amplifier 643 and a threshold detector 644, the output of which represents a "start" input to a range gate 646. The "stop" input for the range gate 646 is provided as the output from the threshold detector 636 contained within the receiver section 332.

While it will be appreciated by those skilled in the art that both digital and analog techniques may be used for making the time interval measurement in order to accurately measure the propagation time of the laser pulse to the target and back to the receiver, the analog technique has been chosen in the copending invention because of its resolution, smaller size, simpler circuitry, lower power consumption and lower costs when compared with the digital technique. The analog range measurement technique specifically used in the present invention is known as a "time-to-amplitude converter" and has an accuracy of about one percent of measured range and a resolution of about plus or minus 5 centimeters.

The specific forms of the range gate 646 and the time-to-amplitude (TAC) converter circuit 648 are shown described in the copending applications and described earlier in this section with reference to FIG. 2C. A constant-current source including transistor Q1 is used to charge a ramp capacitor C38 to obtain a linear voltage ramp whose instantaneous value is a measure of elapsed time. The TAC circuit is designed so that the voltage across the capacitor C38 begins ramping down from the positive power supply when the laser diode 606 fires. The ramp is stopped when either a reflected pulse is received at the detectors 626 or 628, or at the end of a measured period of time. The output 649 of the TAC converter 648 is then converted to a digital format by an 8 bit analog-to-digital converter inside the microprocessor 652 (FIG. 11). The start timing pulse for the TAC converter 648 is produced utilizing the optical detection of the transmitted laser pulse through the fiber 614, which provides an input to the detector 642 and thence to the amplifier 643.

As shown on the left hand side of the range/processor section 334 in FIG. 11, the output of the amplifier 634 from the receiver section 332 is provided as an input to a peak detector 650 which in turn provides an input to the microprocessor 652. This feature is directed to a major problem previously encountered when measuring range-to-vehicles in the low level of return signals from windshield and poorly reflecting black metal or plastic vehicle parts. This low level of return signals frequently results in range readings which are close to those from the street level, and would therefore erroneously indicate that a vehicle was not present. This range measurement error, which is proportional to the magnitude of the variation in return-signal level, is known as "timing walk". This problem is solved by the accurate measurement of the peak of the return signal with the high-speed peak detector circuit 350, and the use of the microprocessor 652 to apply a correction factor to the range measurement based on the return signal level. Thus, a very low level of the signal is in itself an indication of the presence of an object (such as a vehicle) being detected. The sensor will then indicate the presence of the object when either the range reading is shorter than that to the street, or alternatively when the return-signal level is much less than that from the street.

In one specific arrangement, the microprocessor 652 comprises an Intel 87C196KC into which the software described below is loaded. As noted in range/processor section 334 in FIG. 11, the microprocessor 652 provides various outputs to light emitting diode indicators 653, a presence relay 656 for indicating the presence of an object, an RS 232 computer interface 657 and to a heater relay 666 contained within the power supply 336, described below. The microprocessor 652 receives additional inputs from a temperature sensor 651 and a real time clock 654. The range/processor section 634 preferably also includes a battery backup circuit 658.

The power supply section 336 includes an EMI/surge protection circuit 662 for a power supply 664 operated by 110 volt line current. The power supply circuit includes a heater relay 666 controlled by the microprocessor 652, as discussed above, and receiving 110 volts line power. The heater relay is coupled to the window 320, to maintain the temperature of the window 320 constant for varying ambient conditions.

A preferred embodimen1 of the software useful in connection with the sensor system and method of the copending invention is illustrated in flow charts and discussed in detail in the copending application. It will of course be understood that the software is loaded in an object code format into the microprocessor 652, and is designed to control the electrical-optical assembly 328 of the sensor 310 in order to detect the presence of objects and to provide certain desirable outputs representative of the object, including for example, the speed with which the object moves through the area being sensed, the size and shape of the object, its classification and perhaps other characteristics. In one specific form, the sensor 310 has utility as a vehicle sensor for mounting in an overhead configuration in order to detect the presence of vehicles passing through an area—such as a portion of a roadway at an intersection—to identify the presence of a vehicle, classify the vehicle as either an automobile, truck or motorcycle, count the number of vehicles passing through the intersection and calculate the speed of each vehicle and the flow rate of all of the vehicles. The software was specifically configured for those purposes.

The software operates the electrical-optical assembly 328 to find the range to the road. The software then sets up the receiver to detect return beam 322, and the range and return-signal intensity is read; the range and intensity reading is then toggled between the two beams 322 and 324 as illustrated in FIG. 9. Following the reading of the range and intensity from each of the two beams 322 and 324, any necessary offset is added to the range based on the intensity to correct timing walk as discussed earlier. The change in the range (i.e., the road distance minus the distance to any object detected) is calculated. If the resulting calculation is greater than the vehicle threshold, then a vehicle pulse counter is tested to determine if there have been 16 consecutive pulses above the vehicle threshold; if the calculation is less than the vehicle threshold, then another sequence of steps is initiated to reset the vehicle pulse counter and thereby toggle between the beams 322 and 324. Various resets and adjustments are made including the calculation of the distance between the two beams, the calculation of the average range to the road, and the minimum/maximum range to the road.

If the road pulse counter is reset, an inquiry is made as to whether the vehicle has already been detected; if the answer is affirmative, then an inquiry is made to determine if the change in range determined earlier is greater than the truck threshold in order to complete a truck-detection sequence. On the other hand, if the inquiry is negative, then the vehicle presence relay is set, a vehicle pulse counter is incremented, and a velocity timer is started for purposes of determining the speed of the vehicle passing through the area being sensed.

In the operation of the sensor 310 and its associated electrical-optical assembly 328 in a vehicle-detection configuration reference-fs again made to FIGS. 9 and 10.

In FIG. 9, the sensor 310 is depicted as elevated to a height H above a roadway 326, and is displaced at an angle Theta 327 so as to be pointed toward an area 329 on the roadway 326 defined by the beam separation W and the beam length L, and which is located a range distance R between the sensor 310 and the area. In accordance with the discussion above with respect to the electrical-optical assembly 328, the sensor 310 transmits two separate beams 322 and 324 which fall upon the area defined by the length L and the width W. As shown in FIG. 10, if a vehicle 327 is positioned across the roadway 326 at the area 329 defined by the length L and the beam separation W, a portion 322A of the radiated energy in beam 322 (for example) will bescattered away from the vehicle 327, while a portion 322B is reflected back toward the sensor 310 for detection by receiver section 332, as described.

As a result of the above description, it is thus understood that the microprocessor 652 using the software and the various inputs from the electrical-optical assembly first measures the range to the road; if the range falls below a predetermined threshold, the microprocessor signals that a vehicle 327 is present by closing the presence relay 656 illustrated in FIG. 11. The threshold is determined by calculating the minimum, maximum and average range to the road for 100 discrete measurements. The maximum error is then calculated by subtracting the average from the maximum range measurement and the minimum from the average range measurement. The threshold is then set to the maximum error. The microprocessor 652 utilizing the software classifies the vehicle detected (as, for example, an automobile, a truck or a motorcycle) by examining the amount of range change, it being understood that a truck produces a much larger range change than an automobile, and a motorcycle a much smaller range change. The software keeps an accurate count of vehicles by classification for a predetermined period (for example, 24 hours) and in one example maintains a count of vehicle types for each hour of the day in order to provide a user flow rate.

The microprocessor 652 and the associated software also calculates the vehicle speed in the manner described above, by calculating the time each vehicle takes to pass between the two beams 322 and 324. Specifically, the microprocessor 652 utilizes a microsecond time increment, and is reset to zero when the first beam 322 detects the presence of a vehicle, and is read when the vehicle is detected by the second beam. The software then automatically calculates the distance between the two beams 322 and 324 by applying the law of cosines to the triangle formed by the two beams and the distance between them at the level of the roadway 326 in FIG. 9. The speed is then calculated by taking the distance between the beams and dividing it by the time the vehicle takes to travel that distance.

The sensor 310 can also be utilized to ascertain the existence of poor highway visibility conditions, which is useful in providing a warning to drivers to slow down because of dangerous visibility conditions. The amplitude of the return signal received by the vehicle sensor is proportional to the atmospheric transmittance (visibility). Analysis has shown that the sensor can detect vehicles until heavy fog or rainfall reduces the visibility range to 18 m. Corresponding to the change in visibility from clear day to foggy conditions, the received signal power decreases by a factor of 22. Thus, a measurement of the return-signal amplitude can be used to ascertain the existence of poor highway visibility conditions. If the microprocessor 652 senses a return-signal level from the roadway below a certain preselected threshold, then the software can initiate an output through the interface 657 to an appropriate visibility warning signal.

As discussed in the copending application, tests were conducted during May-August 1992 utilizing the copending invention as an overhead vehicle sensor on a roadway in Orange County, Fla. The sensor achieved a detection percentage of 99.4%, and measured speed with an accuracy equal to or greater than that of conventional radar guns used for traffic enforcement purposes. The system also provided two dimensional vehicle range and intensity profiles. It was observed that the vehicles were accurately profiled, even in the area of the windshields where the intensity of the return signal was quite low, demonstrating the efficacy of the intensity-dependent range correction in mitigating the effect of timing walk on range measurements at low return-pulse amplitudes.

Concentrating now on the present invention, it is an object of the invention to combine the three dimensional profile capability of the sensor 510 used with the agricultural sprayer with the forward and backward beam technology used in the sensor 310 classifying vehicles to provide the improved present invention having forward and backward scanned beams for determining the speed, improved geometric information and classification of vehicles using the sensor 10 as described earlier and further described in detail below.

Again with reference to FIG. 1, the present invention provides high resolution in both transverse axis (multiple forward cross scans 16 and multiple backward cross scans 20 of a lane 22) and longitudinal axis (collection of a multiplicity of ranges 24 within the scans 16 and 20 along the object or vehicle 14 and 14a passing in the lane 22) to provide a three dimensional profile of the vehicle 12. With reference to FIGS. 12, the sensor 10 is mounted above the highway 12 approximate in the center of a lane 22. By way of example, when a laser beam 26 is pointed in the direction of angle alpha 28 as illustrated with reference to FIG. 12, the sensor 10 makes a measurement of the roadway 12 for angle alpha one 28a. When the beam 26 is pointed in the direction alpha two 28b, it makes the next measurement. This continues at regular angle spacing until measurements are completed across the complete lane 22. By way of example, with a total scan angle of 30 degrees (alpha one 28a plus alpha one 28a) and one degree between measurements, the maximum separation between measurements on the highway 12 can be calculated as approximately 25 ft(tan 15 degrees−tan 14 degrees)=0.465 ft or 5.6 inches. When a vehicle 14 is present, the distances or ranges 24 to the points 30 on the surface 32 of the vehicle 14 are measured as illustrated in FIG. 1. These ranges 24 or measured distances at the various scan angles 28 are then used in generating a vehicle profile 34 as illustrated in FIG. 13. The profile 34 is formed by generating measured points 30 above the highway 12 by geometric transformation well known in the art. The scanning of the laser beam 26 is accomplished in various ways as will be discussed.

If the vehicle 14 in FIG. 1 were stationary, the beam 26 would continue to scan across the same points 30. When the vehicle 14 is moving, the scans, by way of example, the forward scanned beam 16 illustrated in FIG. 1, would be separated by a distance 36 shown in FIG. 13. By determining the speed of the vehicle 14 and the scan repetition rate, the distance 36 is determined and a three dimensional profile 38 of the vehicle is configured once the vehicle 14 passes completely through the forward scanned beam 16.

The scan separation distance divided by the time between beam interrupts is equal to a vehicle speed. In the preferred embodiment of the invention, the sensor 10 comprises a single laser beam transmitter 40 and receiver 42 pair as illustrated in the block diagram of FIG. 14. In this preferred embodiment of the present invention, a rotating mirror 45 having a multiplicity of facets 47 is used to reflect an incident beam 48 and provide the scanning of the beam 48 as the angle of the mirror facet 47 changes through the rotation of the mirror 45. In one embodiment of the rotating mirror 45, the forward scanned beam 16 and the backward scanned beam 20 illustrated in FIG. 1 are generated using a rotating polygon shaped mirror 45. As illustrated in FIGS. 15A1, 15A2 the mirror 44 has angled mirror facets 50 wherein alternating mirror facets 50a and 50b are formed at an angle 52 to each other to reflect the incident laser beam 48 into the forward 16 and backward 20 beams as the mirror 44 is rotated about its axis 54. It should be understood that when laser beam 48 scanning is discussed, the laser beam receiver 42 has a field-of-view also scanning since the laser beam axis and receiver field-of-view are aligned and therefore the returned reflected beam illustrated in FIG. 14 is collinear.

To continue with the above example, one embodiment comprises a 12 sided mirror 44 rotating so as to provide a scan rate of 720 scan/sec. If the vehicle 14 is traveling at a rate of 100 mph or 146.7 feet/sec, the scan separation distance 36 would be equal to 146.7 ft/sec divided by 720 scans/sec or 2.4 inches. For a vehicle 14 traveling at 50 mph, the separation distance 36 is less than 1.25 inches. Such separation distances 36 provide detail sufficient to provide a three dimensional profile for accurately classifying the vehicle 14.

Besides being a useful piece of data, the vehicle speed is required for length and size scaling of the vehicle 14. The technique used in the present invention is similar to that taught in the copending application in that two scanning beams are used, that of forward 16 and backward 20 of the present invention. As illustrated in FIG. 16, the sensor of the preferred embodiment has the forward beam 16 tilted at 5 degrees toward oncoming traffic and the backward beam tilted at 5 degrees away from oncoming traffic traveling in the lane 22. As described earlier, the laser beam transmitter 40 is triggered at each one degree (angle alpha 28) increment of the 30 degree scan 28. Again with reference to FIG. 1, a vehicle 14 will intercept the forward scanned beam 16 and then the vehicle 14a will intercept the backward scanned beam 20 and the time between interceptions is calculated. The distance between the forward 16 and backward 20 beams on the highway 12 is equal to 2×25×tan 5 degrees or 4.37 feet. At 100 mph and a scan rate of 720 scans/sec as discussed in the example considered, there are 21.47 scans between the interception of the two scanned beams 16 and 20. Using timing signals from the generated laser pulses, as described earlier with reference to FIG. 11 and as illustrated in the block diagram of FIG. 14, the maximum timing error possible is one scan period and does not exceed 5% at 100 mph and 2.5% at 50 mph. The length measurement accuracy of the vehicle profile 38 is a function of speed and is therefore within 5% when the vehicle 14 is traveling at 100 mph and improves linearly as the speed decreases.

When using the rotating polygon shaped mirror 44 having the angled facets 50 illustrated in FIGS. 15A1, 15A2, a microcontroller 56 keeps track of the mirror position using incremental readings from a shaft encoder 58 within mirror electronics 60 of the sensor 10. Therefore, the mirror surface facet 47 and the angle 28, again as illustrated with reference to FIG. 1 at which a range measurement is being taken is known and a representative signal 62 provided to the microcontroller 56 as illustrated in FIG. 14. The shaft encoder 58 triggers a laser driver 64 with a first set of consecutive pulses which provide the scanned beam at a predefined angle and will be offset by another set of consecutive pulses resulting from the rotating mirror 44 and the discontinuities between facets 50. Range/processor electronics in the present invention is as described earlier for the copending application invention referencing FIG. 11. Likewise, power supply 68 electronics and control of a heated sensor window 70 for the present invention is as described earlier for the copending invention.

Figure 17:
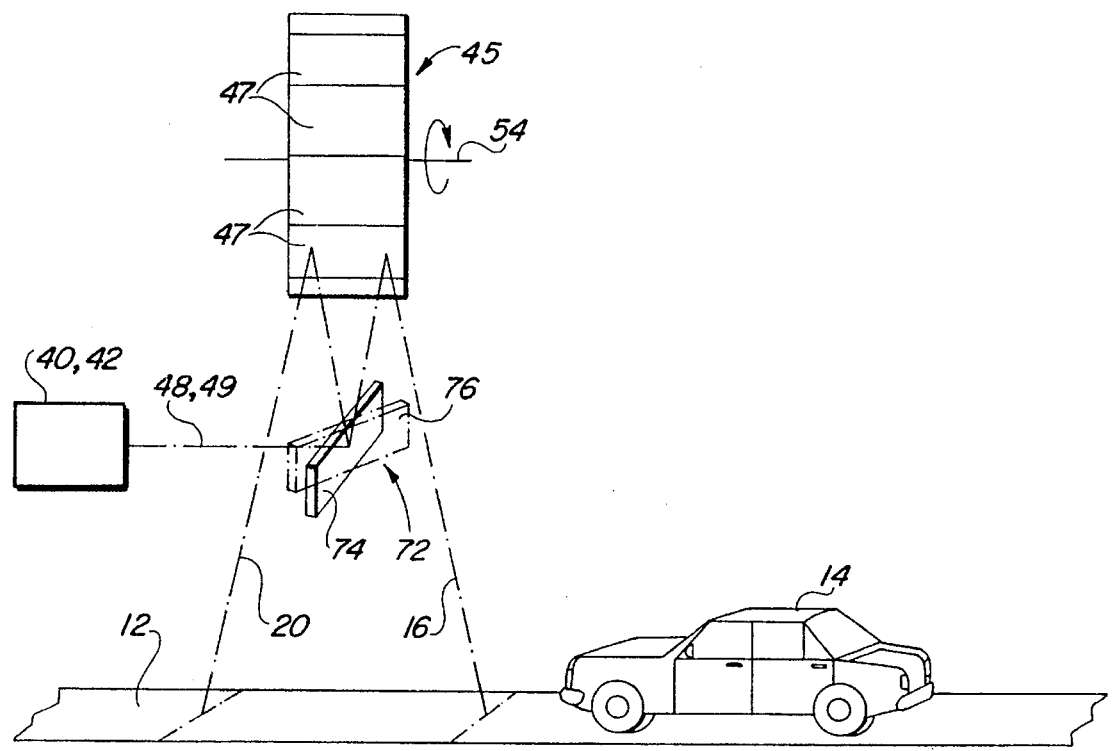
FIG. 17 illustrates the use of a rotating twelve sided polygon mirror to scan a beam and a dual-position nodding mirror deflecting the beam onto alternate rotating mirror facets to reflect the beam into forward and backward scanned beams.

An alternate embodiment for providing the forward 16 and backward 20 scanned beams is illustrated in FIG. 17 and again with reference to FIG. 14, and comprises 1the use of a nodding mirror 72 which changes from a first position 74 to a second position 76 to reflect the laser beams 48 and 49 off of facets 47 of a rotating polygon shaped mirror 45 having facets 47 at the same inclination unlike the angled mirror facets 50a and 50b described earlier. As further illustrated in FIG. 14, a bi-stable positioner 78 directs the nodding mirror 72 into its first 74 and second 76 positions. In the embodiment of the invention illustrated in FIG. 14, a twelve sided polygon is used for the rotating mirror 45. In this embodiment, the microcontroller 56 provides a signal 80 to the bi-stable positioner 78 which moves the nodding mirror 72 on every other mirror facet 47. As discussed, the functional flow of the electronics generally follows that of the copending invention described by reference to FIG. 11. However, one can view the present invention as having optical/mechanical multiplexing with the use of the nodding mirror 72 and optics described rather than the analog multiplexing described in the copending invention.

Figure 18:
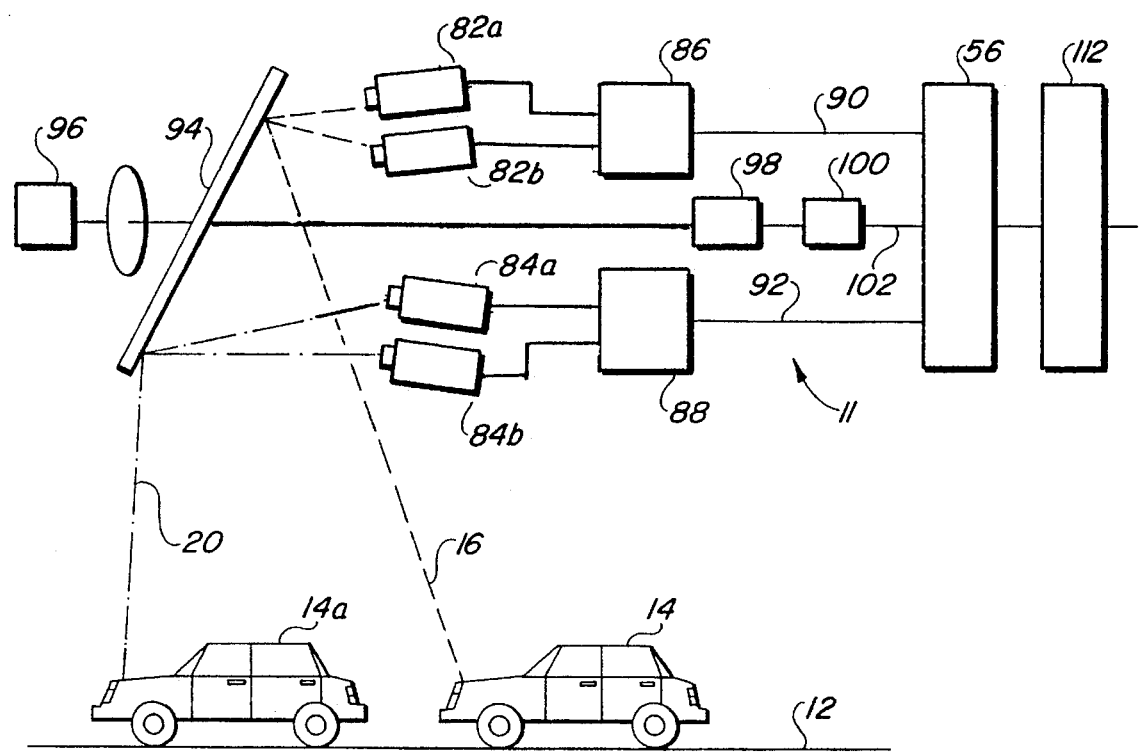
FIG. 18 is a schematic diagram of an embodiment of the present invention using two transmitters and two receivers for forming the forward and backward scanned beams.
Figure 20A:
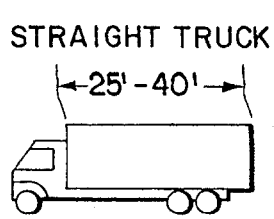
FIGS. 20a through 20j illustrate "American Truck Association Truck Types" by way of example, for use in toll road vehicle data collection and classification.
Figure 20B:
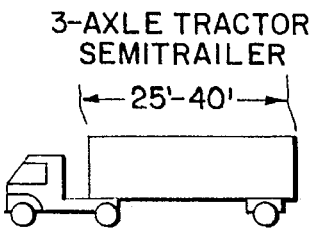
Figure 20C:
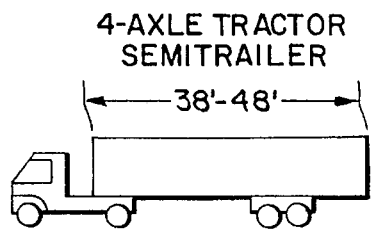
Figure 20D:
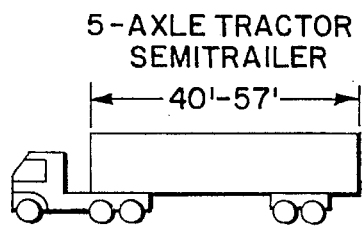
Figure 20E:
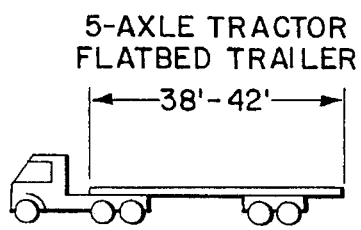
Figure 20F:
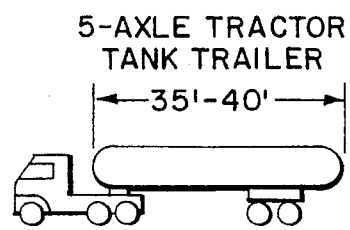
Figure 20G:
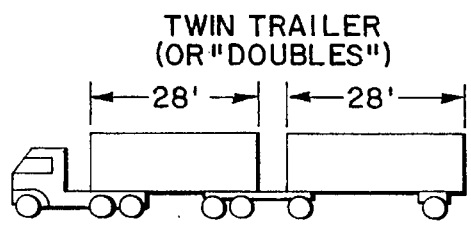
Figure 20H:
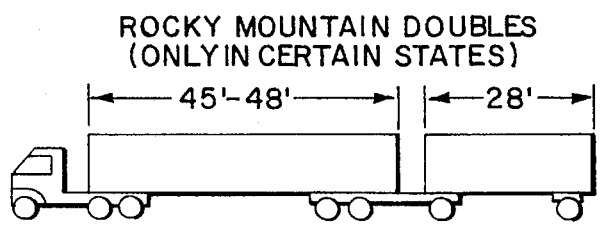
Figure 20I:
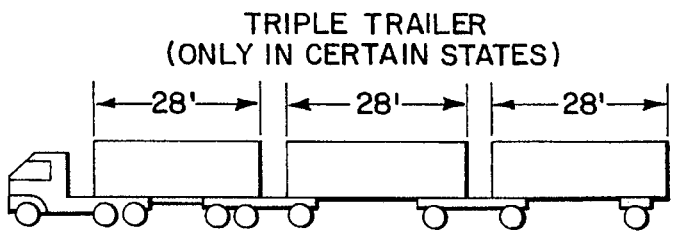
Figure 20J:
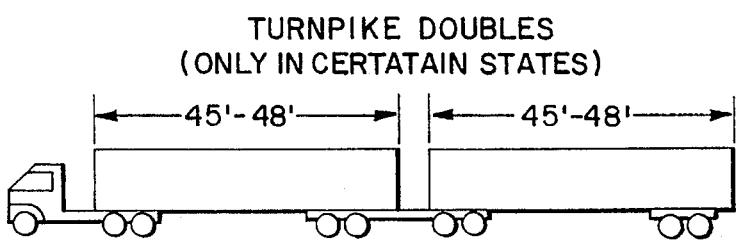

In yet another embodiment of the present invention, forward 16 and backward 20 scam beams are provided using two laser transmitters 82a and 82b as well as two receivers 84a and 84b as illustrated in FIG. 18. Comparison to FIG. 2 for the sensor 510 of the copending application supports this embodiment as well. The electronics of the sensor 11 follows that as described in the sensor 510 as described earlier for the copending invention used with the agricultural sprayer. The exception being that for the sensor 11 for the alternate embodiment of the present embodiment comprises dual range measurement circuitry 86 and 88 for providing range data signals 90 and 92 to the microcontroller 56. A rotating planar mirror 94 is rotated by a motor 96 whose revolutions are monitored by an encoder 98.and counter 100 for providing angle data signals 102 to the microcontroller 56. As functionally illustrated in FIG. 18, the forward beam 16 and backward beam 20 are positioned at predetermined angles as described earlier by directing the transmitter/ receiver pairs at appropriate angles to form the forward 16 and backward 20 beams. As described earlier in the copending application, the rotating mirror 94 scans through a full cycle but only data applicable to the scanned beams of interest will be processed. Likewise, it will be obvious to one skilled in the art to place the dual transmitter/receiver 82*ab* and 84*ab* setup herein described with the electronics of sensor 10 as yet another embodiment for providing the forward 16 and backward 20 scanned beams.

Figure 21:
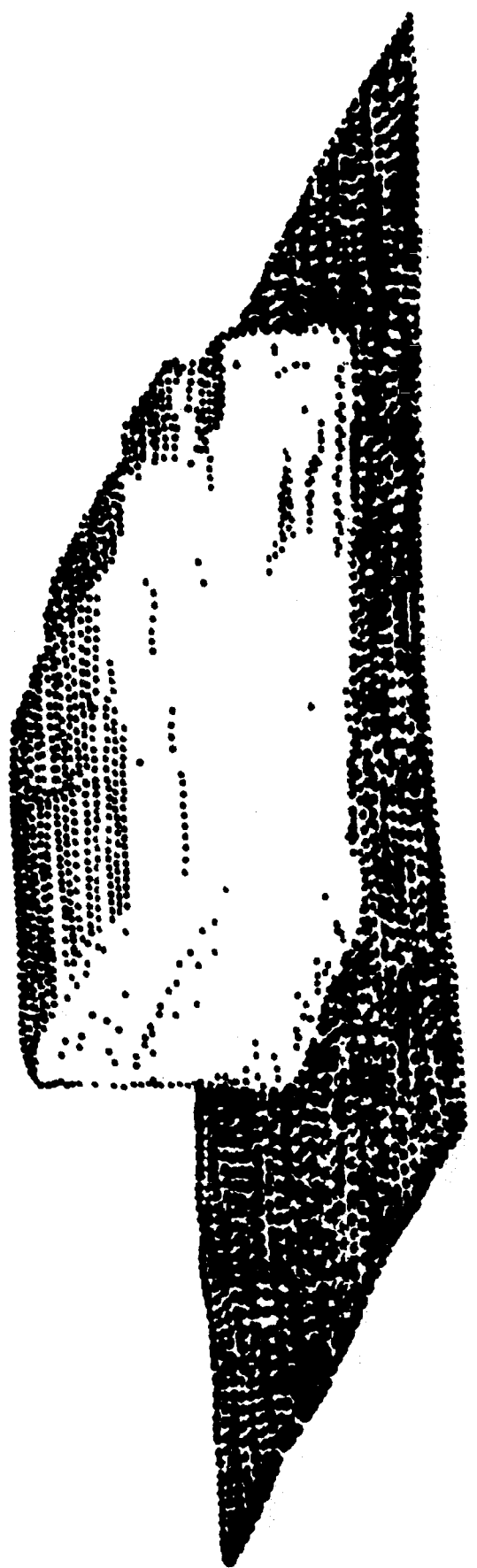
FIG. 21 is a perspective view illustrating a three dimensional truck profile provided by the present invention illustrated with a black and white ink tracing of a monitor screen.

With reference to FIG. 19A and 19B, the microprocessor 52 receives range 104 and return pulse intensity 106 signals and as described earlier for the copending sensor 310, performs time walk corrections for accounting for range measurement error and provides a corrected range 108 used with the respective angle 28 for providing a cosine correction in the scanning plane and resulting range data set 110 representative of a sensor surface such as the points 30 on the vehicle 14 as described earlier with reference to FIG. 1. This range data set 110 is then processed in the microcomputer 112 for classification with known vehicles. Forward 16 and backward 20 beams are distinguished and corresponding forward scan 114 and backward scan 116 signals are input to the microcontroller 56 for use in time calculations to determine the vehicle speed. In this way, the three dimensional vehicle profile illustrated in FIG. 13B is constructed with reference to the highway 12. Profiles 38 are matched against database profiles in the microprocessor 112. Predetermined rules for comparison are used that will include, by way of example, total vehicle surface area, vehicle height above the roadway, and other distinguishing database vehicle characteristics effective in classifying the vehicles. Once the rules are established, general rule base algorithms are used in completing the classification. With reference to FIGS. 20*a* through 20*j* the complexity of the classification can be appreciated by examining the truck types established by the American Trucking Association as one example. It is anticipated that multiple sensors 10 will be used to provide classification in certain situations where additional detail for a vehicle or multiple vehicles in multiple lanes is required. Comparing the three dimensional vehicle profile 38 illustrated in FIG. 13 for an automobile and the three dimensional profile of FIG. 21 for a truck to the two dimensional profiles illustrated in the copending application Ser. No. 07/980,273 in FIGS. 9 and 10 respectively will demonstrate the expanded uses of the present invention and the improved vehicle classification thus permitted.

A preferred embodiment of the software useful in connection with the sensor system and method of the present invention is illustrated in flow chart form in FIGS. 22 through 28 with portions of the software depicted in each of those figures being arbitrarily designated by reference numerals. It will of course be understood that the software is loaded in an object code format and is designed to control the sensor 10 electrical, optical and mechanical components as illustrated in discussions referencing FIGS. 14, 19A and 19B. In one specific form, the sensor 10 has utility for determining the speed of a vehicle and determining its vehicle classification through comparison of its three dimensional profile with known vehicles establish in a database. The software of FIGS. 22 through 28 has been specifically configured for these purposes and in fact make use of software techniques further detailed in the copending application software.

Figure 22:
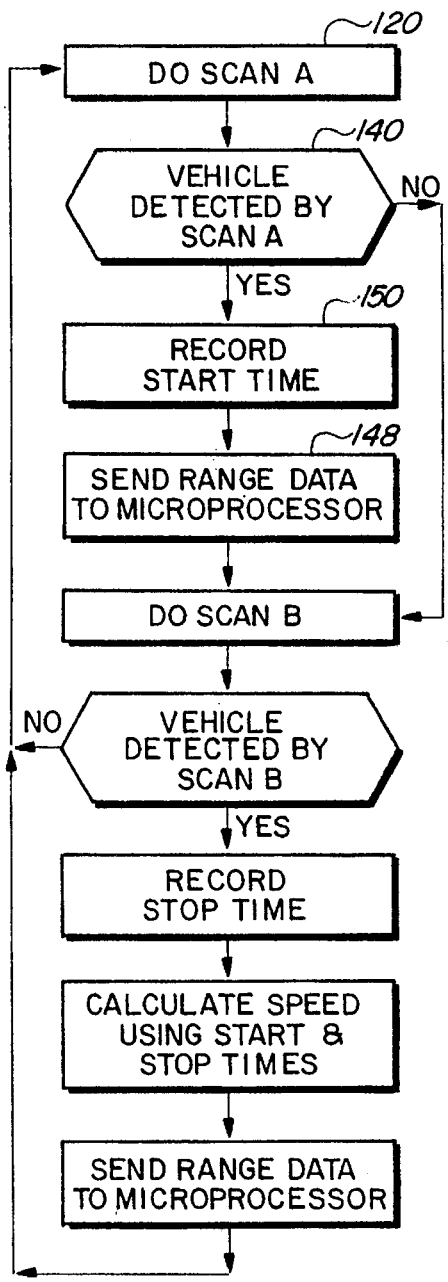
Figure 23:
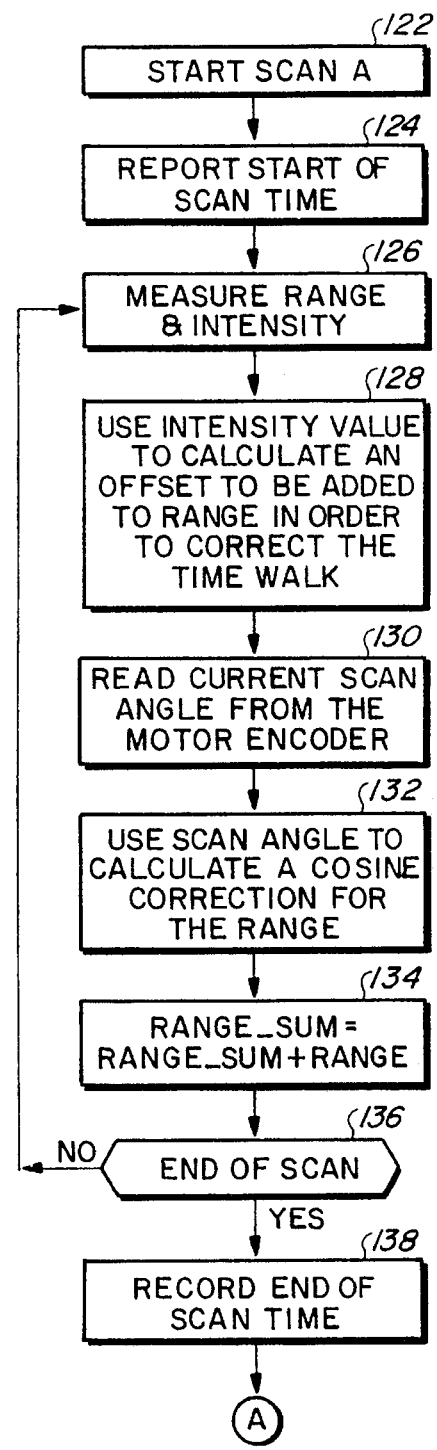
Figure 24:
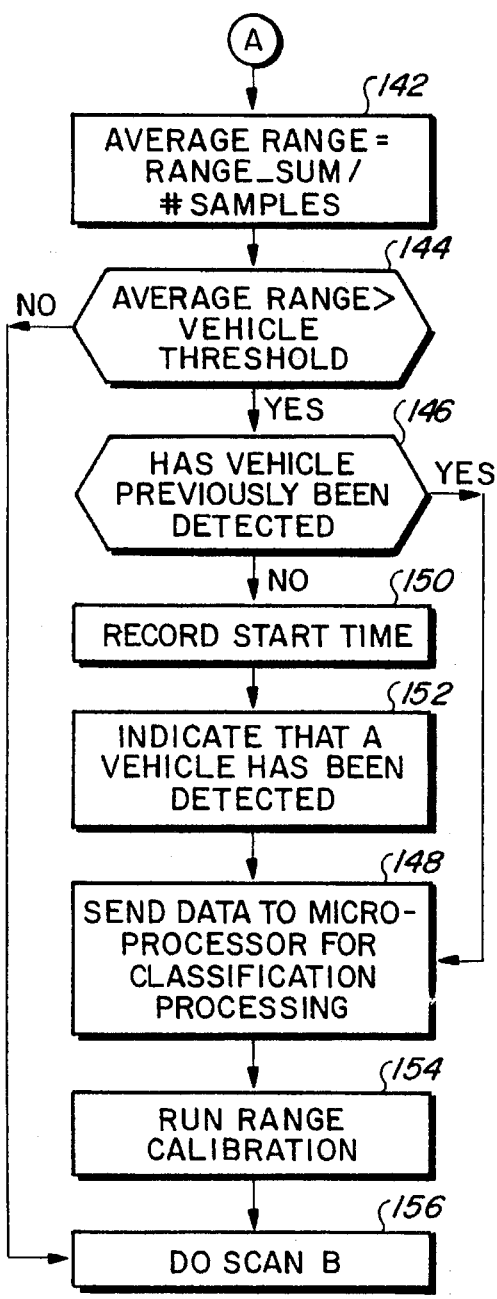
Figure 25:
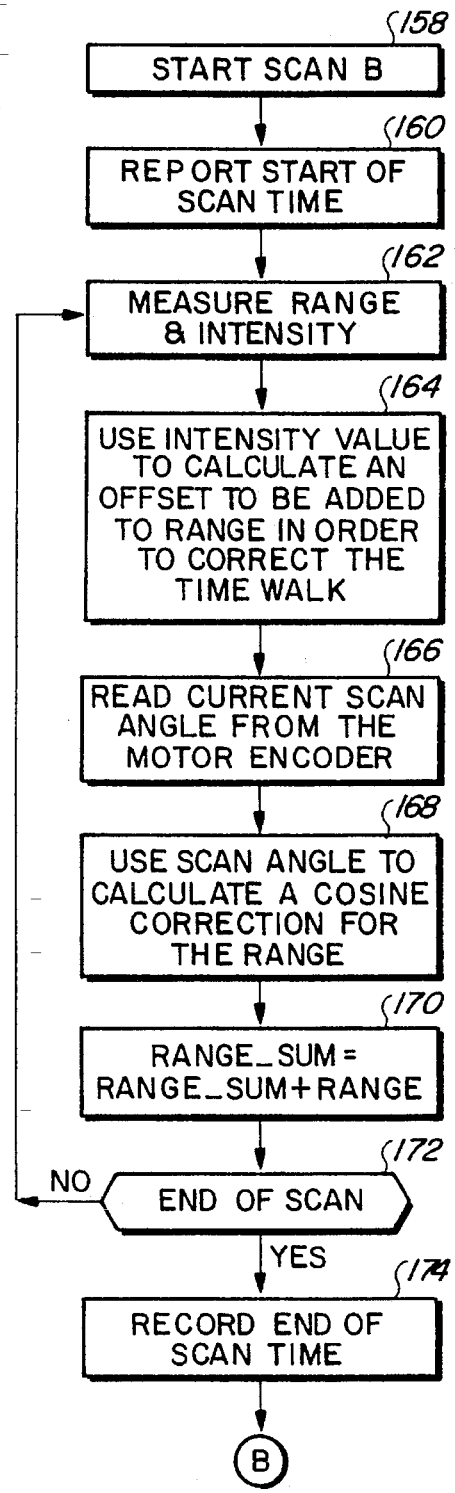

Referring first to FIG. 22, the microcontroller software scan 120 in the forward scanned beam 16. FIG. 23 further illustrates that this scan 120 is started 122 and the start time recorded 124. A range and intensity are measured 126 as described earlier. The intensity value is used to calculate an offset to be added to the range in order to correct for time walk 128. Such a process is further detailed in the copending application for sensor 310. The current scan angle 28 is determined from the motor encoder 59 within the mirror electronics 60 and the information used to calculate a cosine correction for the range 130 and 132 as earlier discussed. Ranges are accumulated 134 and recalculated at the various predetermined angle increments for the predetermined scan 136 and the end of the scan time is recorded 138. Once the scan cycle described is completed, it is determined whether a vehicle has been detected 140 by comparing ranges measured with sample ranges for database vehicles 142 and determining how such ranges compare 144 (refer to FIG. 24). If a vehicle has previously been detected 146 data is sent to the microprocessor for classification 148, start times are recorded 150 and vehicle detection indicated 152 if a vehicle was not previously detected. Copending software uses these 150 and 152 steps and has further detail included in its specification for a reference. A range calibration is run 154 and then the process begins for the backward scanned beam 156. As illustrated in FIG. 25, the backward scan begins 158 and the start time recorded 160. The process is as described in steps 162 through 174 and is as described for the forward scan in steps 122 through 138 and as described for the forward scan in 142 through 154 as 176 through 184 (see FIG. 26). Except in the backward scan processing, a stop time is recorded 186 if a vehicle was nor previously detected. With the start time from the vehicle crossing the forward beam and stop time when the vehicle crosses the backward beam, a speed is calculated using the time period determined and the known distance between the beams 16 and 20. Once the backward scan is completed for all the predetermined angles 28, the forward scan is then again begun 190.

The microcontroller 56 completing its tasks as described, the microprocessor 112 performs its tasks which are illustrated in the flow charts of FIGS. 27 and 28. A data packet from the microcontroller 56 containing range, intensity, angle and time data 192 in FIG. 28, is processed through a median filter for smoothing over each scan profile 194. A feature set for the classification is calculated 196 for comparing the features of the vehicle detected to the features of vehicles contained in a vehicle database library 198 and vehicle speed and classification is provided as an output 200. In calculating a feature set for the detected vehicle (196 of FIG. 27), each scan is assembled into an image forming a three dimensional profile of the vehicle (202 of FIG 28) as illustrated in FIG. 13. Features used in the calculation are calculated 204 and compared as discussed 198 and an output provided 200. The features compared are not limited to but include vehicle surface area 206, length of the vehicle 208, width of the vehicle 210, height of the vehicle 212, a ratio of cross-sectional surface area to total surface area 214 intensity 192.

As described earlier in this specification section and in the copending application, the sensor 310 used in vehicle detection is useful in determining and recording other highway conditions such as visibility. The sensor 10 of the present invention is also used to determine such visibility conditions useful for the Intelligent Vehicle Highway Systems.

A reading by those skilled in the art will bring to mind various changes without departing from the spirit and scope of the invention. While preferred embodiments of the invention have been described in detail herein above, it is to be understood that various modifications may be made from the specific details described herein above without departing from the spirit and scope of the invention as set forth in the appended claims.

What is claimed is:

1. A laser sensor useful in determining the shape of a vehicle, the sensor comprising:

laser means for determining a range from the sensor to points on a vehicle when the vehicle travels within a sensing zone of the sensor and for providing range data outputs corresponding to sensor angles for ranges from the sensor to the points on the vehicle;

means for scanning the laser means within a plane across the vehicle for determining the range for the points on two dimensions of the vehicle, the scanning means having a scanning direction generally orthogonal to a direction of travel for the vehicle the scanning means providing means for determining the range and a corresponding sensor angle for each point within the scanning plane;

means for determining a vehicle speed; and means for processing the ranges, angles and vehicle speed for providing a multiplicity of two dimensional cross-sectional profiles of the vehicle, the processing means positioning the profiles based on the vehicle speed for providing a three dimensional image representative of the vehicle, the image useful in classifying the vehicle.

2. The sensor as recited in claim 1, wherein the speed determining means comprises:

means for providing a forward beam and a backward beam emitted by the laser means, the forward and backward beams diverging at a predetermined angle, the beams directed toward the sensing zone through which zone the vehicle travels, the beams separated by a predetermined distance;

a first time signal provided by the laser means representative of an interception of a point on the vehicle with the forward beam; and a second time signal provided by the laser means representative of the interception of the point by the backward beam to travel between the beams, the first and second times providing the travel time for the predetermined distance between the beams, the time signals determined from time-of-flight data provided by the range processing means.

3. A sensor as recited in claim 1, wherein the scanning means comprises:

a mirror intercepting the emitted beam and reflecting the beam into a plane, a reflected beam directed back toward the mirror being similarly directed into corresponding apertures of a receiver;

means for rotating the mirror about an axis for scanning the beam, the rotating mirror reflecting the scanning beam within the plane; and an encoder communicating with the mirror for providing the beam orientation and corresponding sensor angle.

4. The sensor as recited in claim 2, wherein the forward and backward beam providing means comprises:

the mirror having a polygon shape; and first and second reflective facets affixed to the mirror, the first and second facets inclined from each other by a predetermined facet angle, the facets forming the sides of the polygon, wherein the rotating means alternately positions the first and second facets for receiving the emitted laser beam and reflecting the beam into the forward beam when reflected from the first facet and into the backward beam when reflected from the second facet.

5. The sensor as recited in claim 2, wherein the forward and backward beam providing means comprises:

the mirror having a polygon shape wherein equally dimensioned reflective facets form the sides of the polygon;

a nodding mirror positioned to reflect the emitted beam onto the rotating mirror facets; and means for alternately positioning the nodding mirror into a first position wherein the emitted beam is reflected onto a first portion of the rotating mirror facet for forming the forward beam, and the second nodding mirror position reflects the emitted beam onto a second portion of the rotating mirror facet for forming the backward beam.

6. The sensor as recited in claim 1, wherein the laser range determining means comprises:

a transmitter for emitting a laser beam;

means for directing the beam; and a receiver for converting a reflected laser beam to a signal, the signal representative of a range between the receiver and a point on the vehicle.

7. A sensor as recited in claim 6, wherein the scanning means comprises:

a mirror intercepting the beam emitted from the transmitter and reflecting the beam into a scanning plane, the plane at a predetermined angle from a perpendicular to a roadway, the reflected beam directed back toward the mirror being similarly directed into 1corresponding apertures of the receiver;

a motor having a rotatable shaft affixed to the mirror for continuously rotating the mirror about the axis; and an encoder affixed to the motor shaft so as to identify an angular position of the mirror relative to a reference angle.

8. A sensor as recited in claim 2, wherein the scanning means comprises:

a first transmitter and receiver having similarly directed apertures, the first transmitter positioned for emitting a first beam onto a first portion of a rotating reflective surface and reflecting the beam into the forward scanning beam;

a second transmitter and receiver having similarly directed apertures, the second transmitter positioned for emitting a second beam onto a second portion of a rotating reflective surface and reflecting the second emitted beam into the backward scanning beam;

an optically reflective surface for intercepting the beams and reflecting the beams at predetermined angles from a perpendicular to a roadway, the beams reflected off of the vehicle being directed back toward the mirror into corresponding apertures of the receivers;

means for rotating the reflective surface across a reflective angle sufficient for reflecting the beams across a transverse portion of the vehicle, the reflective surface positioned to receive the first beam onto a first portion of the surface and receiving the second beam onto a second portion of the surface; and an encoder affixed to the rotating means for identifying an angular position of the mirror relative to a reference angle and providing a signal representative of the sensor angle of the scanning beams, the angle signals delivered to the processing means for providing range data at corresponding angles, the range and angle data in combination useful in providing a transverse profile of the vehicle.

9. The sensor as recited in claim 1, wherein the processing means comprises a microprocessor programmed to receive respective range and sensor angle data for storing and processing the data for a scanned cycle associated with a vehicle speed, whereby such processed data results in a shape profile suitable for use in classifying the vehicle.

10. The sensor as recited in claim 9, further comprising an algorithm for comparing the vehicle profile with a multiplicity of predetermined vehicle shapes for classifying the vehicle.

11. A sensor for detecting the presence of an object within an area, the sensor comprising:

means for emitting a first output of pulsed, coherent radiation in a forward plane toward a first fixed area a known distance from the emitting means;

means for scanning the first output radiation across the first fixed area;

means for receiving a portion of the returning first pulsed energy reflected from the first area;

means for determining a time of flight change for pulses between the first emitting and first receiving means caused by the presence of an object in the first area;

means for emitting a second output of pulsed, coherent radiation in a backward plane toward a second fixed area a known distance from the emitting means;

means for scanning the second output radiation across the second fixed area;

means for receiving a portion of the returning second pulsed energy reflected from the second area;

means for diverting the pulsed energy output of the emitting means into two diverging directional beams;

means for determining a time of flight change for pulses between the second emitting and second receiving means caused by the presence of an object in the second area; and means for receiving input from the time of flight determining means and for providing range, angle and speed output for indicating whether the object meets one of a plurality of classification criteria.

12. The sensor recited in claim 11, wherein the means for emitting pulses of coherent energy comprises a laser diode.

13. The sensor recited in claim 11 wherein the receiving means comprises two detectors, the sensor further comprising means for alternately selecting between outputs of the two detectors for providing an input to the time of flight determining means.

14. A sensor for detecting the presence of a vehicle within close range and suitable for measuring traffic speed and vehicle classification, the sensor comprising:

means for emitting a directional output of pulsed energy toward a fixed area a known distance from the emitting means;

means for scanning the pulsed energy output in a fixed plane;

means for receiving a portion of returning pulsed energy reflected from the area;

means for determining a time-of-flight change for pulses between the emitting and receiving means caused by the presence of a vehicle in the area;

means for determining a vehicle speed as the vehicle passes through the fixed area;

means for processing signals received from the emitting, scanning, receiving and speed determining means for providing range and sensor angle data, the data useful in determining a vehicle profile; and means for comparing the vehicle profile with predetermined profiles for classifying the vehicle.

15. The sensor as recited in claim 14, wherein the speed determining means comprises:

means for providing a forward beam and a backward beam emitted by the laser means, the forward and backward beams diverging at a predetermined angle, the beams directed toward the fixed area through which the vehicle travels, the beams separated by a predetermined distance in the area: and a first time signal provided by the laser means representative of an interception of a point on the vehicle with the forward beam; and a second time signal provided by the laser means representative of the interception of the point by the backward beam to travel between the beams, the first and second times providing the travel time for the predetermined distance between the beams, the time signals determined from time-of-flight data provided by range processing means.

16. The sensor recited in claim 14 further comprising means including a peak return signal level detector for determining a timing error caused by amplitude variations in returning reflected energy and providing a range correction thereto.

17. The sensor as recited in claim 16 wherein the timing error determining means comprises means for forming a logic-level output representative of the time-of-flight of each pulse.

18. The sensor recited in claim 14 wherein the emitting means comprises means for emitting pulses of coherent infrared radiation.

19. The sensor recited in claim 18 wherein the means for emitting pulses of coherent infrared radiation comprises a laser diode.

20. The sensor recited in claim 19 wherein the laser diode comprises a junction diode, further comprising means for collimating the output of the laser diode.

21. The sensor recited in claim 14 further comprising means for dividing the pulses of the emitting means into two diverging directional beams.

22. The sensor recited in claim 14 wherein the emitting and receiving means comprise respectively two transmitters and two receivers, the sensor further comprising means for selecting between outputs of the two detectors for providing inputs to the time-of-flight determining means.

23. The sensor recited in claim 14 further comprising means for providing an indication of the presence of a vehicle from one of an output from the time-of-flight determining means and an output from the peak return signal level detector.

24. A method for determining the shape of a vehicle useful in classify the vehicle, the method comprising the steps of:

providing a sensor having a laser beam transmitter and optical receiver for the beam;

determining a range from the sensor to a vehicle when the vehicle travels within a sensing zone of the sensor;

providing respective range data outputs corresponding with a sensor angle for a range to a point on the vehicle;

scanning the laser beam across the vehicle for determining the range for points on two dimensions of the vehicle;

determining the beam orientation and a corresponding sensor angle;

determining a vehicle speed; and processing the ranges and corresponding angles for providing a multiplicity of two dimensional cross-sectional profiles of the vehicle;

positioning the profiles based on the vehicle speed; and providing a three dimensional image representative of the vehicle, the image useful in classifying the vehicle.

25. The method as recited in claim 24, wherein the speed determining step further comprises the steps of:

providing a forward beam and a backward beam emitted by the laser means, the forward and backward beams diverging at a predetermined angle;

directing the beams toward the sensing zone through which zone the vehicle travels;

separating the beams by a predetermined distance within the zone;

providing a first time signal from the laser means representative of an interception of a point on the vehicle with the forward beam; and providing a second time signal from the laser means representative of the interception of the point by the backward beam to travel between the beams, the first and second times providing the travel time for the predetermined distance between the beams, the time signals determined from time-of-flight data provided by the range processing means.

26. The method as recited in claim 24, wherein the scanning step comprises:

providing a mirror;

intercepting the emitted beam with the mirror and reflecting the beam into a plane, a reflected beam directed back toward the mirror being similarly directed into corresponding apertures of a receiver;

rotating the mirror about an axis for scanning the beam, the rotating mirror reflecting the scanning beam within the plane; and providing an encoder for communicating the mirror orientation;

providing the beam orientation and corresponding sensor angle.

27. The method as recited in claim 25, wherein the forward and backward beam providing step comprises the steps of:

forming the mirror into a polygon shape;

affixing first and second reflective facets to the mirror for forming sides of the polygon shape mirror; and inclining the first and second facets at angles from each other at a predetermined facet angle, wherein the rotating of the mirror alternately positions the first and second facets for receiving the emitted laser beam and reflecting the beam into the forward beam when reflected from the first facet and into the backward beam when reflected from the second facet.

28. The method as recited in claim 25, wherein the forward and backward beam providing step comprises the steps of:

forming the mirror into a polygon shape having equally dimensioned reflective facets forming the sides of the polygon;

positioning a nodding mirror for reflecting the emitted beam onto the rotating mirror facets; and alternately positioning the nodding mirror into a first position wherein the emitted beam is reflected onto a first portion of the rotating mirror facet for forming the forward beam, and the second nodding mirror position for reflecting the emitted beam onto a second portion of the rotating mirror facet for forming the backward beam.

29. A method for determining the shape of a vehicle for purposes of classification of the vehicle, the method comprising the steps of:

providing a sensor having a laser beam transmitter and an optical receiver for the laser beam;

scanning the laser beam across the vehicle in a predetermined scanning zone;

measuring a range and angle for a plurality of scanned cycles as the vehicle travels through the zone;

measuring a time and distance traveled by the vehicle within the zone; and processing the measured range, angle, travel time and distance data for determining a vehicle profile and speed.

30. The method as recited in claim 29, wherein the time and distance measuring step further comprises the steps of:

providing a second laser beam transmitter and second optical receiver;

scanning the second laser beam in a divergent plane form the laser beam, both beams scanned across the vehicle in the predetermined scanning zone;

measuring a range and angle for a plurality of scanned cycles as the vehicle travels through the beams in the zone; and measuring a time interval between intersections of the two diverging beams by the vehicle for calculating the speed of the vehicle from the time and distance traveled by the vehicle within the zone.

31. The method as recited in claim 30, wherein the scanning step comprises the steps of:

providing a mirror;

placing the transmitter and receiver pairs side-by-side;

placing a mirror in the path of the laser beam and positioning the mirror for communicating with the transmitters and receivers;

placing the axis of one transmitter and receiver such that an emitted beam axis and reflected beam axis are parallel and form the forward scanned beam;

placing the axis of the second transmitter and receiver at an angle to the first transmitter and receiver such that an emitted beam axis and reflected beam axis are parallel and form the backward scanned beam divergent from the forward beam;

directing the divergent beams toward a predetermined zone;

providing a motor having a shaft;

affixing the shaft to the mirror for continuously rotating the mirror, the scanning beams being in planes diverging from a perpendicular to a path of travel by the vehicle; and affixing an encoder to the shaft for associating a scanning angle with a range, the encoder providing a signal output representative of the angle for a given range.

32. The method for sensing an object as recited in claim 29, further comprising the steps of:

measuring a time-of-flight for a given laser beam pulse leaving the transmitter and detected by the receiver after being reflected from the vehicle, the time-of-flight indicating the range for a particular pulse; and repeating time-of-flight measurements at a plurality of angles, the angles sufficient for scanning a transverse dimension of the vehicle.

33. The method as recited in claim 29, further comprising the steps of:

providing a microprocessor; and processing range, angle, time and distance information by the microprocessor for calculating vehicle profiles and speed of travel;

providing a microcomputer for receiving the range, angle, time and distance information;

forming vehicle dimensional profiles for comparison with predetermined profiles; and comparing the vehicle profile with predetermined profiles for classifying the vehicle.

* * * * *

UNITED STATES PATENT AND TRADEMARK OFFICE
CERTIFICATE OF CORRECTION

PATENT NO. : 5,546,188

DATED : August 13, 1996

INVENTOR(S) : Richard J. Wangler, et. al.

Figure 7:
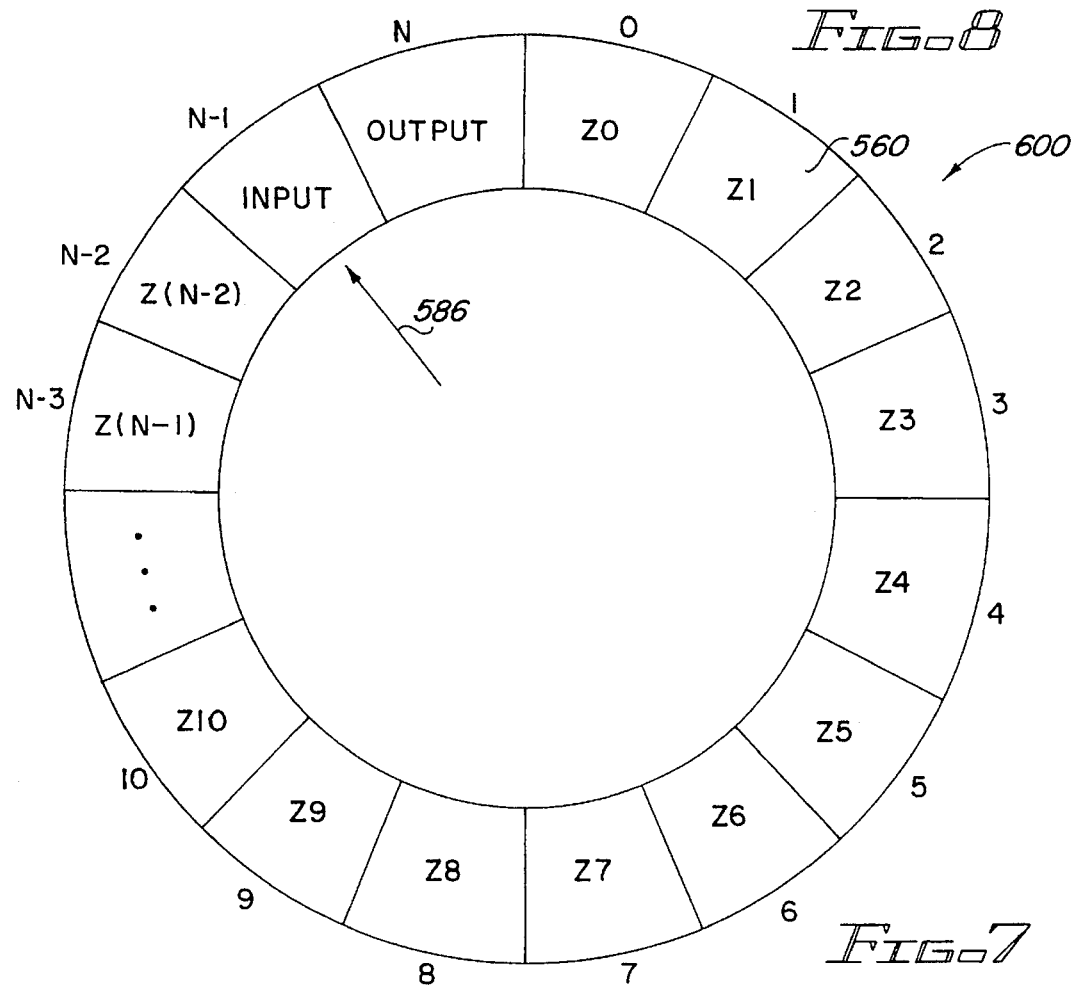
FIG. 7 illustrates a circular queue data structure for a plurality of zones used in storing scanned range data.

It is certified that error appears in the above-indentified patent and that said Letters Patent is hereby corrected as shown below:

| | |
|---|---|
| Column 7, Line 49: | "aperture 26" should read --aperture 526--. |
| Column 8, Line 39: | "time-of-flight" should read --time-to-amplitude--. |
| Column 9, Line 38: | "Hight (tree) = Height (sensor) * Sin (Angle)" should read --Height (tree) = Height (sensor) + Range * SIN (Angle)--. |
| Column 9, Line 57: | "tree 517" should read --tree 514--. |
| Column 10, Line 63: | "measures" should read --measured--. |
| Column 11, Line 21: | Strike numerals "504" and "506". |
| Column 11, Line 52: | "trees 517" should read --trees 514--. |
| Column 11, Line 61: | "FIGS. 7 and 8" should read --FIGS. 9 and 10--. |
| Column 12, Line 1: | "FIG. 3" should read --FIG. 11--. |
| Column 12, Line 41: | "fiber 314" should read --fiber 614--. |
| Column 14, Line 2: | "circuit 350" should read --circuit 650--. |
| Column 14, Line 31: | "embodiment1" should read --embodiment--. |
| Column 16, Line 50: | "vehicle 12" should read --vehicle 14--. |
| Column 17, Line 7: | "beam 26" should read --beam 16--. |
| Column 19, Line 25: | "FIG. 13B" should read --FIG. 13--. |

UNITED STATES PATENT AND TRADEMARK OFFICE
CERTIFICATE OF CORRECTION

PATENT NO. : 5,546,188
DATED : August 13, 1996
INVENTOR(S) : Richard J. Wangler, et. al.

It is certified that error appears in the above-indentified patent and that said Letters Patent is hereby corrected as shown below:

| | |
|---|---|
| Column 20, Line 28: | "nor" should read --not--. |
| FIG. 3: | Numerals "16" should read --516--. |
| FIG. 6: | Numeral "574" should read --514--. |
| FIG. 19A: | Numeral "112" should read --114--; numeral "114" should read --116--. |

Signed and Sealed this

Third Day of June, 1997

Attest:

BRUCE LEHMAN

Attesting Officer

Commissioner of Patents and Trademarks